United States Patent
Beers

(10) Patent No.: US 12,505,117 B2
(45) Date of Patent: Dec. 23, 2025

(54) VISUALIZING TEMPORAL INFORMATION

(71) Applicant: Tableau Software, LLC, Seattle, WA (US)

(72) Inventor: Andrew C. Beers, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 18/531,661

(22) Filed: Dec. 6, 2023

(65) Prior Publication Data

US 2024/0104111 A1 Mar. 28, 2024

Related U.S. Application Data

(63) Continuation of application No. 17/478,772, filed on Sep. 17, 2021, now abandoned.

(51) Int. Cl.
*G06F 16/248* (2019.01)
*G06F 3/0482* (2013.01)
*G06F 3/04847* (2022.01)
*G06F 16/2458* (2019.01)
*G06F 16/28* (2019.01)

(52) U.S. Cl.
CPC .......... *G06F 16/248* (2019.01); *G06F 3/0482* (2013.01); *G06F 3/04847* (2013.01); *G06F 16/2477* (2019.01); *G06F 16/287* (2019.01)

(58) Field of Classification Search
CPC .. G06F 16/248; G06F 3/0482; G06F 3/04847; G06F 16/2477; G06F 16/287
See application file for complete search history.

(56) References Cited

U.S. PATENT DOCUMENTS

| | | | |
|---|---|---|---|
| 6,477,525 B1 * | 11/2002 | Bello | G06F 16/24556 |
| | | | 707/999.2 |
| 9,710,527 B1 | 7/2017 | Sherman | |
| 10,650,032 B1 | 5/2020 | Laurence | |
| 2010/0250584 A1 | 9/2010 | Wildeman | |
| 2015/0067565 A1 | 3/2015 | Yan | |

(Continued)

OTHER PUBLICATIONS

Beers, Office Action, U.S. Appl. No. 17/478,772, filed Aug. 12, 2022, 16 pgs.

(Continued)

*Primary Examiner* — Yuk Ting Choi
(74) *Attorney, Agent, or Firm* — Morgan, Lewis & Bockius LLP

(57) ABSTRACT

A user selects a data source. The user also selects a first point in time and a second point in time. The visualization platform generates a query to perform a full outer join between (1) a first data set corresponding to the first point in time and (2) a second data set corresponding to the second point in time. The platform then executes the query to retrieve a result set. The platform classifies each record in the retrieved result set as new, present, or removed according to whether the respective record: (1) corresponds only to a record in the second data set; (2) corresponds to records in both the first data set and the second data set; or (3) corresponds only to a record in the first data set. Finally, the platform generates and displays a Sankey diagram or Waterfall chart according to the retrieved result set and the classifications.

20 Claims, 16 Drawing Sheets

(56) References Cited

U.S. PATENT DOCUMENTS

| | | | |
|---|---|---|---|
| 2017/0075955 A1* | 3/2017 | Yuyama | G06F 16/24542 |
| | | | 707/737 |
| 2017/0364553 A1 | 12/2017 | Jacob | |
| 2018/0095952 A1* | 4/2018 | Rehal | G06F 16/907 |
| | | | 707/737 |
| 2018/0232111 A1* | 8/2018 | Jones | G06F 3/0482 |
| | | | 707/722 |
| 2018/0232426 A1* | 8/2018 | Gomez | G06F 16/258 |
| | | | 707/722 |
| 2019/0095508 A1 | 3/2019 | Porath | |
| 2019/0324952 A1 | 10/2019 | Hedberg | |
| 2019/0324953 A1 | 10/2019 | Hedberg | |
| 2023/0113933 A1* | 4/2023 | Beers | G06F 16/248 |
| | | | 707/722 |
| 2024/0104111 A1* | 3/2024 | Beers | G06F 16/287 |
| | | | 707/722 |

OTHER PUBLICATIONS

Beers, Final Office Action, U.S. Appl. No. 17/478,772, filed Dec. 9, 2022, 17 pgs.
Beers, Office Action, U.S. Appl. No. 17/478,772, filed Mar. 17, 2023, 18 pgs.
Beers, Final Office Action, U.S. Appl. No. 17/478,772, filed Jul. 12, 2023, 17 pgs.
Beers, Notice of Allowance, U.S. Appl. No. 17/478,772, filed Sep. 6, 2023, 12 pgs.

* cited by examiner

*500*

Oct 10th, 2020 — 502

| ID | Account | Amt |
|---|---|---|
| 1 | Red | 12 |
| 2 | Green | 34 |
| 3 | Blue | 56 |

Oct 14th, 2020 — 504

| ID | Account | Amt |
|---|---|---|
| 2 | Green | 34 |
| 3 | Blue | 56 |
| 4 | Violet | 78 |

506

| t1.ID | t1.Account | t1.Amt | t2.ID | t2.Account | t2.Amt |
|---|---|---|---|---|---|
| 1 | Red | 12 | null | null | null |
| 2 | Green | 34 | 2 | Green | 34 |
| 3 | Blue | 45 | 3 | Blue | 56 |
| null | null | null | 4 | Violet | 78 |

| 10/10/2020 | | |
|---|---|---|
| ID | Account | Amt |
| 1 | Red | 12 |
| 2 | Green | 34 |
| 3 | Blue | 56 |

604

| 10/14/2020 | | |
|---|---|---|
| ID | Account | Amt |
| 2 | Green | 34 |
| 3 | Blue | 67 |
| 4 | Violet | 78 |

606

| t1.ID | t1.Account | t1.Amt | t2.ID | t2.Account | t2.Amt |
|---|---|---|---|---|---|
| 1 | Red | 12 | null | null | null |
| 2 | Green | 34 | 2 | Green | 34 |
| 3 | Blue | 56 | 3 | Blue | 67 |
| 4 | null | null | 4 | Violet | 78 |

702
Oct 10th, 2020

| ID | Account | qtr_closed | Amt |
|---|---|---|---|
| 1 | Red | 4/1/2020 | 12 |
| 2 | Green | 4/1/2020 | 34 |
| 3 | Blue | 4/1/2020 | 56 |

704
Oct 14th, 2020

| ID | Account | qtr_closed | filt | Amt |
|---|---|---|---|---|
| 2 | Green | 4/1/2020 | TRUE | 34 |
| 3 | Blue | 7/1/2020 | FALSE | 67 |
| 4 | Violet | 1/1/2020 | FALSE | 78 |
| 5 | Pink | 4/1/2020 | TRUE | 90 |

706

| t1.ID | t1.Account | t1.qtr_closed | t1.Amt | t2.ID | t2.Account | t2.qtr_closed | t2.filt | t2.Amt |
|---|---|---|---|---|---|---|---|---|
| 1 | Red | 4/1/2020 | 12 | x | x | x | x | x |
| 2 | Green | 4/1/2020 | 34 | 2 | Green | 4/1/2020 | TRUE | 34 |
| 3 | Blue | 4/1/2020 | 56 | 3 | Blue | 7/1/2020 | FALSE | 67 |
| x | x | x | x | 4 | Violet | 1/1/2020 | FALSE | 78 |
| x | x | x | x | 5 | Pink | 4/1/2020 | TRUE | 90 |

*Fig. 7*

802 — Oct 10th, 2020

| ID | Account | qtr_closed | flt | Amt |
|---|---|---|---|---|
| 1 | Red | 4/1/2020 | TRUE | 12 |
| 2 | Green | 4/1/2020 | TRUE | 34 |
| 3 | Blue | 4/1/2020 | TRUE | 56 |
| 4 | Violet | 1/1/2020 | FALSE | 78 |
| 5 | Pink | 1/1/2020 | FALSE | 90 |

804 — Oct 14th, 2020

| ID | Account | qtr_closed | flt | Amt |
|---|---|---|---|---|
| 2 | Green | 4/1/2020 | TRUE | 34 |
| 3 | Blue | 7/1/2020 | FALSE | 67 |
| 4 | Violet | 1/1/2020 | FALSE | 78 |
| 5 | Pink | 4/1/2020 | TRUE | 90 |

VISUALIZING TEMPORAL INFORMATION

RELATED APPLICATIONS

This application is a continuation of U.S. patent application Ser. No. 17/478,772, filed Sep. 17, 2021, titled "Visualizing Temporal Information," which is incorporated by reference in its entirety.

TECHNICAL FIELD

The present invention relates generally to data visualization, and more particularly, but not exclusively, to visualizing temporal information.

BACKGROUND

Organizations are generating and collecting an ever-increasing amount of data. This data may be associated with disparate parts of the organization, such as, consumer activity, manufacturing activity, customer service, server logs, or the like. For various reasons, it may be inconvenient for such organizations to effectively utilize their vast collections of data. In some cases, the quantity of data may make it difficult to effectively utilize the collected data to improve business practices. In some cases, organizations may generate visualizations of the some or all of their data. Employing visualizations to represent this data may enable organizations to improve their understanding of critical business operations and help them monitor key performance indicators. In some cases, organizations may desire to employ visualizations for analyzing temporal data. However, in some cases, conventional visualization tools may be directed to visualizing snapshots in time, current/latest values, or the like, rather than providing visualizations that represent changes across time periods. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 5 illustrates a logical schematics of a system for visualizing temporal information in accordance with one or more of the various embodiments;

FIG. 6 illustrates a logical schematic of a system for visualizing temporal information in accordance with one or more of the various embodiments;

FIG. 7 illustrates a logical schematic of a system for visualizing temporal information in accordance with one or more of the various embodiments;

FIG. 8 illustrates a logical schematic of a system for visualizing temporal information in accordance with one or more of the various embodiments;

DETAILED DESCRIPTION OF VARIOUS EMBODIMENTS

Figure 1:
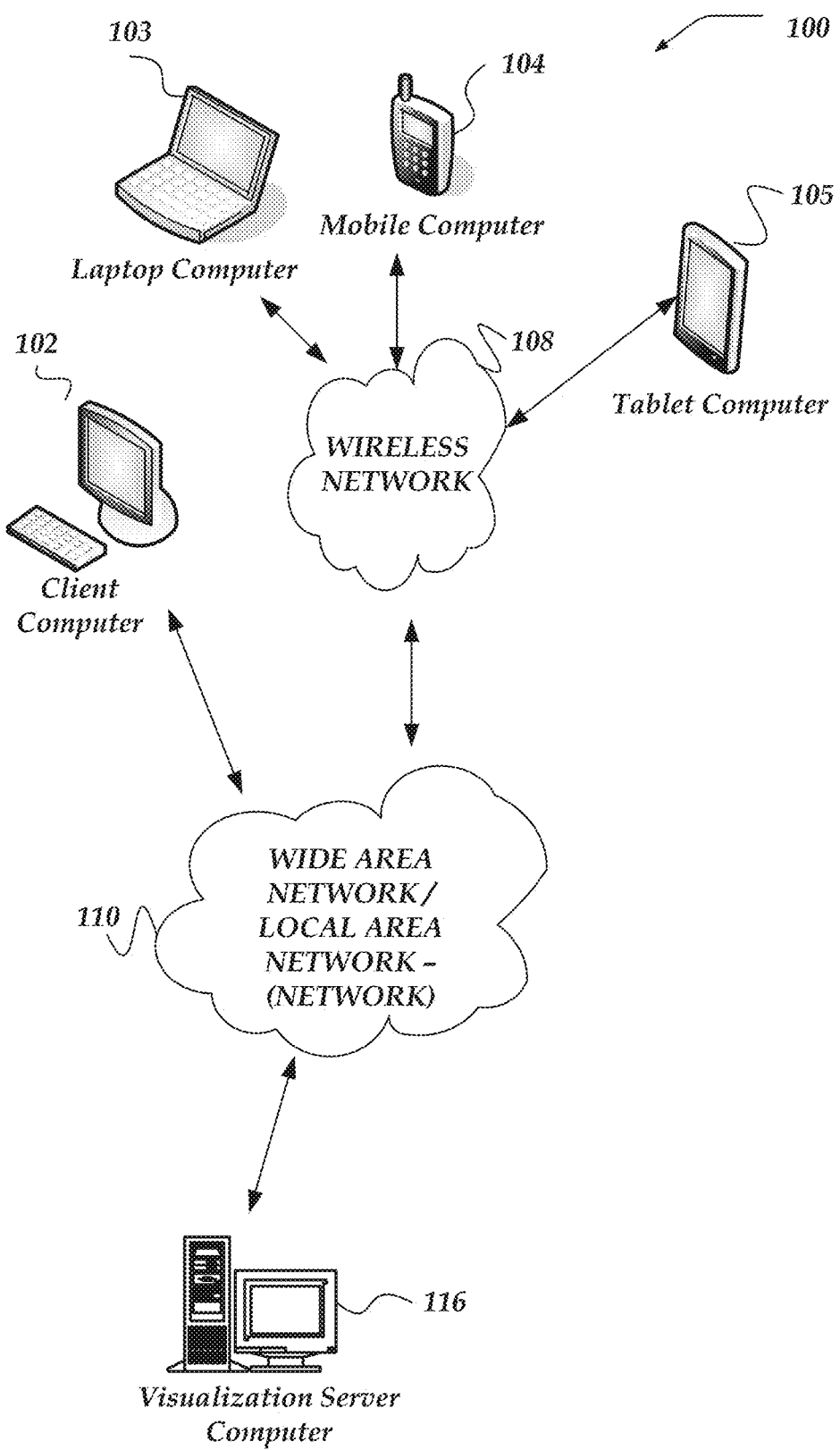
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "data source" refers to databases, applications, services, file systems, or the like, that store or provide information for an organization. Examples of data sources may include, RDBMS databases, graph databases, spreadsheets, file systems, document management systems, local or remote data streams, or the like. In some cases, data sources are organized around one or more tables or table-like structure. In other cases, data sources be organized as a graph or graph-like structure.

As used herein the term "data model" refers to one or more data structures that provide a representation of an underlying data source. In some cases, data models may provide views of a data source for particular applications. Data models may be considered views or interfaces to the underlying data source. In some cases, data models may map directly to a data source (e.g., practically a logical pass through). Also, in some cases, data models may be provided by a data source. In some circumstances, data models may be considered interfaces to data sources. Data models enable organizations to organize or present information from data sources in ways that may be more convenient, more meaningful (e.g., easier to reason about), safer, or the like.

As used herein, the term "data object" refers to one or more entities or data structures that comprise data models. In some cases, data objects may be considered portions of the data model. Data objects include items or records that represent instances of classes, types, or kinds of objects.

As used herein, the term "data set" refers to one or more data structures that represent the some or all of the items or records of a data object. Unless otherwise specified the terms data set and data object may be used interchangeably.

As used herein, the term "time point" refers to a point in time associated with a particular state or condition of one or more data objects. Typically, two time points may be selected for comparing changes in data objects that may occur over the time period represented by the two time points.

As used herein, the terms "primary data object," or "primary data set" refer to a data object/data set that represent a current state/version of a data object/data set. The term primary data set may be used to distinguish from time point data sets (see, below) that correspond to different versions of a data set.

As used herein, the terms "time point data object," or "time point data set" refer to data objects or data sets that represent a state or condition of a data object/data set at a particular point in time. Two or more time point data objects, each representing a state of a data object at different points in time, may represent the same primary data object as it existed at different times. The underlying data structures or query information that may be used to generate time point data objects for a particular regular data object may vary depending on the capabilities of the underlying data source or configuration (e.g., schema) of the underlying data source.

As used herein the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As used herein the term "visualization model" refers to one or more data structures that represent one or more representations of a data model that may be suitable for use in a visualization that is displayed on one or more hardware displays. Visualization models may define styling or user interface features that may be made available to non-authoring user.

As used herein the term "configuration information" refers to information that may include rule-based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing visualizations of data. In one or more of the various embodiments, a primary data set may be provided based on a data model and a query such that the primary data set includes one or more records and the query includes a first time point and a second time point.

In one or more of the various embodiments, a first data set may be determined based on the primary data set and the first time point such that the first data set corresponds to a version of the primary data set that corresponds to the first time point.

In one or more of the various embodiments, a second data set may be determined based on the primary data set and the second time point such that the second data set corresponds to a version of the primary data set that corresponds to the second time point.

In one or more of the various embodiments, a result data set may be generated based on the first data set and the second data set such that each record in the result data set may be based on a combination of a corresponding record from the first data set and another corresponding record from the second data set.

In one or more of the various embodiments, each record in the result data set may be classified based on a comparison of the corresponding record from the first data set and the other corresponding record from the second data set such that each record in the result data set may be classified as new, present, or removed.

In one or more of the various embodiments, one or more changes to one or more values in the primary data set that occur between the first time point and the second time point may be determined based on the classified records in the result data set.

In one or more of the various embodiments, one or more visualizations that represent the one or more changes may be generated.

In one or more of the various embodiments, classifying each record in the result data set may include: determining a first field in the result data set that corresponds to a primary key of the first data set; determining a second field in the result data set that corresponds to a primary key of the second data set; comparing a value of the first field with another value of the second field for each record in the result set; in response to the value of the first field being non-null and the value of second field being null, classifying each record as a removed record; in response to the value of the first field being null and the value of second field being non-null, classifying each record as a new record; and in response to the value of the first field being non-null and the value of second field being non-null, classifying each record as a present record.

In one or more of the various embodiments, generating the one or more visualization may include: determining a first field in the result data set that corresponds to a field-of-interest of the first data set; determining a second field in the result data set that corresponds to a field-of-interest of the second data set; and generating a Sankey diagram based on the change in a value of the first field and another change in a value of the second field.

In one or more of the various embodiments, one or more filter conditions may be determined based on the query information. In some embodiments, each record in the first data set and each record in the second data set may be evaluated based on the one or more filter conditions. And, in some embodiments, the result data set may be updated to include an additional field for each filter such that the additional field for each filter stores a value indicating if a record in the first data set or another record in the second data set meet the conditions of a corresponding filter.

In one or more of the various embodiments, a graphical user interface (GUI) that includes a display of the visualization may be generated. In some embodiments, one or more controls in the GUI may be generated such that the one or more controls include one or more slider controls for selecting two or more time points. In some embodiments, another first time point and another second time point may be determined based on one or more interactions with the one or more slider controls. In some embodiments, the query based on the other first time point and the other second time point may be updated. And, in some embodiments, the visualization may be updated based on an execution of the updated query.

In one or more of the various embodiments, one or more data sources may be provided based on one or more databases such that the primary data set is provided from one or more tables in the one or more databases.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)— (network) 110, wireless network 108, client computers 102-105, visualization server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 116, or other computers.

Client computers 102-105 may further be configured to include a client application that enables an end-user to log into an end-user account that may be managed by another computer, such as visualization server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, visualization server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116 is described in more detail below in conjunction with FIG. 3. Although FIG. 1 illustrates visualization server computer 116 or the like, as a single computer, the innovations or embodiments are not so limited. For example, one or more functions of visualization server computer 116, or the like, may be distributed across one or more distinct network computers. Moreover, in one or more embodiments, visualization server computer 116 may be implemented using a plurality of network computers. Further, in one or more of the various embodiments, visualization server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
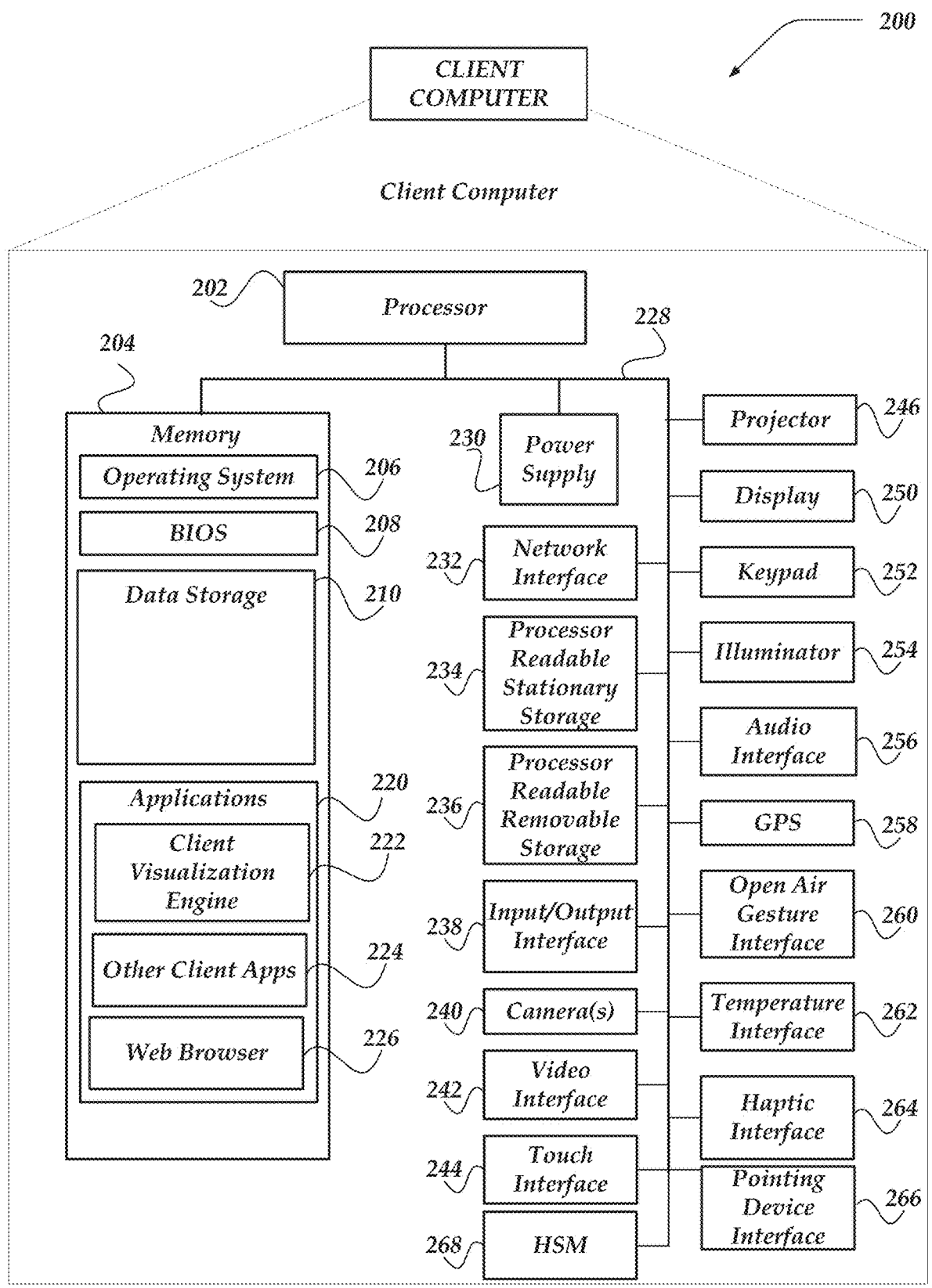
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer.

And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (ALPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client visualization engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
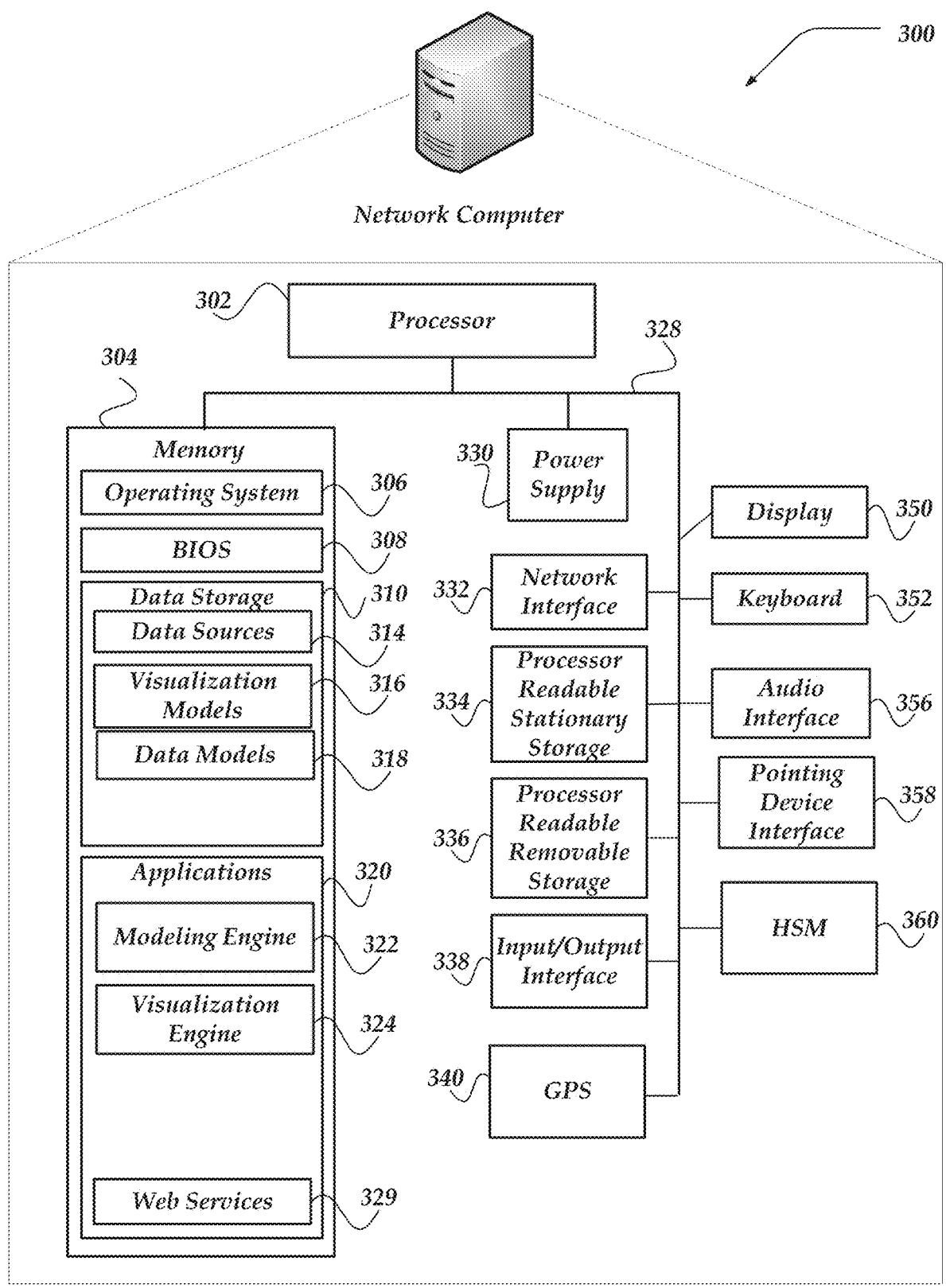
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of visualization server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™ Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (ALPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, modeling engine 322, visualization engine 324, other applications 329, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows operating system, or Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data sources 314, visualization models 316, data models 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include modeling engine 322, visualization engine 324, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, modeling engine 322, visualization engine 324, other applications 329, other applications 329, or the like, may be operative in a cloud-based computing environment. In one or more of the various embodiments, these applications, and others, that comprise a visualization platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to modeling engine 322, visualization engine 324, other applications 329, or the like, may be provisioned and de-commissioned automatically.

Also, in one or more of the various embodiments, modeling engine 322, visualization engine 324, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
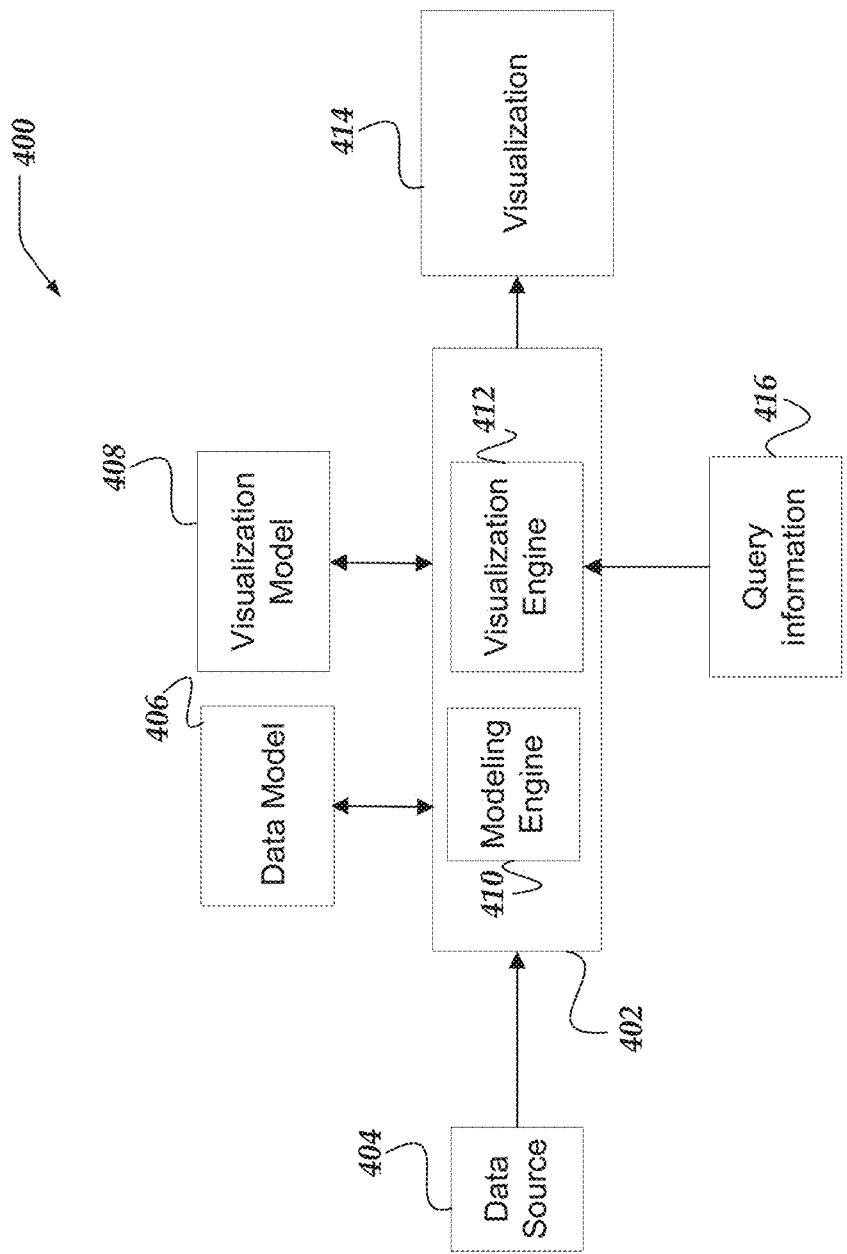
FIG. 4 illustrates a logical architecture of a system for visualizing temporal information in accordance with one or more of the various embodiments.

FIG. 4 illustrates a logical architecture of system 400 for visualizing temporal information in accordance with one or more of the various embodiments. In one or more of the various embodiments, system 400 may be a visualization platform arranged to include various components including: visualization server 402; one or more data sources, such as, data source 404; one or more data models, such as, as data model 406, one or more visualization models, such as, visualization model 408; one or more modeling engines, such as, modeling engine 410; one or more visualization engines, such as, visualization engine 412; one or more visualizations, such as, visualization 414; query information, such as, query information 416; or the like.

In one or more of the various embodiments, visualization servers, such as, visualization server 402 may be arranged to generate one or more visualizations, such as, visualization 414. In some embodiments, visualization server 402 may be arranged to obtain information from data sources, such as, data source 404. Accordingly, in some embodiments, some or all of the information provided by data source 404 may be mapped to or otherwise extracted and transformed into one or more of one or more data models or visualization models. Thus, in some embodiments, visualization servers may be arranged to generate one or more visualizations, such as, visualization 414 based on the data models or visualization models.

In some embodiments, a modeling engine, such as, modeling engine 410 may be employed to transform some or all of information provided by data source 404 into one or more data models, such as, data model 406. In some embodiments, the modeling engine may be arranged to employ or execute computer readable instructions provided by configuration information to determine some or all of the steps for transforming information provided by data sources into data models.

In one or more of the various embodiments, configuration information, including user input, may be employed to select one or more portions of the information provided by data sources to transform into a data model.

In one or more of the various embodiments, visualization models may be comprised of one or more display objects. In some embodiments, display objects may represent a visualization or partial visualization of the data associated with one or more data objects. The particular visualization expressed by a display object may be selected based the composition (e.g., data type, properties, number of items, semantic meaning, or the like) of a given data object. In some embodiments, a data object may be associated with more than one display object, each representing a different visualization of the given data object. Accordingly, display objects may be arranged to represent different common, uncommon, or custom, visualization elements, such as, line plots, surface plots, bar charts, pie charts, tables, text fields, text areas, or the like, that may be included in visualizations to provide improved understanding of data. In some embodiments, visualizations may be targeted for different audiences, such as, customers, stakeholders, internal teams, business intelligence teams, or the like. Accordingly, more than one visualization model may be generated or associated with the same data model.

In one or more of the various embodiments, visualization platforms may be required to generate visualizations that may be employed to analyze how data changes over time. Time-series analysis, the evaluation of a metric as it is sampled over time, may be one approach to looking at data over time. Other analysis may require reasoning about how a set of data items change over time—for example, sales opportunities may change status or size over time, support tickets may change ownership or state. Accordingly, understanding these kinds of changes in these data items may require good data about these items at previous points in time. Innovations disclosed herein provide at least a system that enable visualization engines to leverage temporal databases or snapshot approaches to enable at least this kind of analysis.

In one or more of the various embodiments, data stores, such as data source 404 may contain data about the entities of a system—sales opportunities, support tickets, products, or the like. In some operational systems, this data naturally changes over time. Conventional systems often focus on analyzing this data as it stands at a current time, using various techniques, including, aggregate queries and business intelligence dashboards to understand the data. In some cases, the way this data maps to business concepts may often be straightforward. For example, rows in the data may represent a support case, an individual customer, individual order, or the like.

In some cases, reasoning about data over time enables an understanding of how operational data has changed over time For example, such analysis may answer various questions, including the following examples: how have the number of support tickets on a particular team changed over the past two weeks; how has my total predicted sales pipeline changed since the beginning of the quarter; or the like.

In some cases, questions such as these may rely on understanding how the data associated with individual objects (e.g., support tickets, potential sales, actual sales, or the like) may have changed between two points in time, and then classifying those changes into categories that can be described in aggregate, such as, one set of support tickets that were closed since the first time point, another set of support tickets that were assigned to other teams, another set of support tickets that may be new, other support tickets that may remain open in the second time point, or the like.

In some cases, systems may track changes to data by storing changes to the data as event tables or audit tables. In these type of systems, an application may keep a log of changes to the data as supplemental information. Other systems may treat data as immutable, storing new rows in the table for every change to the data, along with version or timestamp information.

In some embodiments, some systems may build snapshots of operational data sets, capturing the current state of the data on a daily basis, For example, some database systems may support the notion of temporal tables, where changes to the data may be automatically versioned into new rows. In some cases, these tables behave similar to conventional tables in that querying them may, by default, return the current state of the data in the table while enabling prior states of the database to be queried using conventional query languages, such as, standard SQL or extended SQL.

In some cases, capturing data like this may help analysts understand how data may have changed over time, otherwise, it may be difficult to reason about the correct queries. For example, rows of data may not cleanly map to business concepts (except when using a database with temporal support), including time or version information may confuse the meaning of each row. Further, many conventional applications for working with data may not have user interfaces to help analysts overcome these challenges, regardless of how data changes over time may be represented in underlying data sources.

Accordingly, innovations disclosed herein enable visualization platforms to provide interfaces that enable analysts to use interactive visual analytics (e.g., visualizations) to help analysts to understand and explore how data this changes over time.

FIG. 5 illustrates a logical schematics of system 500 for visualizing temporal information in accordance with one or more of the various embodiments.

In some embodiments, computing the differences between data at two different time points may enable analysts to conceptually relate identical records at the two time points and view the observed differences.

In this example, time point data object 502 and time point data object 504 each represent a snapshot of the same primary data object taken at different times. Note, data objects may be referred to as data sets based on each data object including one or more items or records.

In this example, the ID field in each record may be considered a primary key. Accordingly, by observation, the changes in the data between the two time points represented by data object 502 and data object 504 may be described as follows: one record was dropped between the timepoints (ID=1); one record was introduced between the timepoints (ID=4); and two records appears in both timepoints (ID=2 and I D=3).

In one or more of the various embodiments, visualization engines may be arranged to generate a result data object by joining the data object version from the first time point with the data object version at the second time point to provide the result data object, such as, result data object 506. In some embodiments, each item result data object may be generated based a corresponding item (if any) from each time point data object.

Accordingly, in this example, result data object 506 illustrates a data structure for evaluating changes between time point data object 502 and time point data object 504. In this example, column labels prefixed by 't1' correspond to columns from data object 502 and column labels prefixed by 't2' correspond to columns from data object 504.

In this example, data object 506 enables the changes between data object 502 and data set 504 to be classified using the following rules:
  if t1.ID is not null and t2.ID is null then the record is "gone"
  if t1.ID is null and t2.ID is not null then the record is "new"
  if t1.ID is not null and t2.ID is not null then record is "retained"

Accordingly, if the rows of data object 506 may be classified, changes may be aggregated by computing totals for each class of records in data object 506.

FIG. 6 illustrates a logical schematic of system 600 for visualizing temporal information in accordance with one or more of the various embodiments.

As described above, in some cases, classifying records as gone, new, and retained may an advantageous summary of the changes in a data set. However, it may be incomplete because records in tables may contain attributes that can change as well rather than just numerical values (e.g., counts, quantity, prices, or the like) changing. For example, in a data set of sales opportunities, the estimate of the total value of a sales opportunity can change over time as purchase negotiations evolve.

In this example, time point data object 602 and time point data object 604 are slightly different than time point data object 502 or time point data object 504 described above. In these versions of the data objects, the item associated with ID=3 has two changes between the two time points.

In summary, for this example: one item was dropped between the time points (ID=1); one record was introduced between the time points (ID=4); one record appears in both time points but with a changed value (ID=3); and one record appears in both time points with an unchanged value (ID=2).

In some cases, this kind of analysis may be performed with a particular column-of-interest (field-of-interest). For example, an analyst may be interested in the change in sales numbers between two time points. Accordingly, given a column-of-interest (in this case, Amt), rules for classifying the changes may include:

if t1.ID is not null and t2.ID is not null and:
if t1.Amt>t2.Amt the value of interest is "reduced"
if t1.Amt<t2.Amt—value has "increased" else value is "unchanged"

In some cases. the summarization step may be extended to not only compute counts in each class, but also the total values for each class. For example, in the first case above, the value t1.Amt-t2.Amt could be summed to get the total amount in the "reduced" class.

Note, in this example and others herein, for brevity and clarity data objects may be illustrated using tables. However, one of ordinary skill in the art will appreciate that data objects may be represented using data structures, such as, lists, arrays, objects/structures (e.g., C++, Javascript, Java, .Net, or the like), or the like. Likewise, data objects may be stored in various formats, such as, database tables, JSON, XML, CSV, serialized objects, or the like, without departing from the scope of the disclosed innovations.

FIG. 7 illustrates a logical schematic of system 700 for visualizing temporal information in accordance with one or more of the various embodiments.

In this example, time point data object 702 and time point data object 704 are slightly different than time point data object 602 or time point data object 604 described above. In these versions, each data object is illustrated as having a column/field (qtr_closed) for recording the quarter a sale is expected to close and data object 704 also includes a column/field (filt) for indicting if a record should be filtered. Also, in this example, data object 706 may represent a result data object based on data object 702 data object 704.

In some cases, analysts may want to analyze why a subset of the data changes. For example, the analyst may be interested in sales opportunities that have been indicated to close in the current quarter, for example with a qtr_closed column that is filled in by an account manager. Determining sales opportunities that may be indicated as being closed in each time point may be accomplished by filtering the data on the qtr_closed column.

But in some cases, this may introduce another problem. For example, a sales opportunity may be predicted to close in 2020Q1 in the first time point, but 2020Q2 in the second time point. Thus, using the rules above would result in this record being classified as "gone" because it had been filtered out of the second timepoint.

Alternatively, date_closed column may be treated as a column-of-interest (field-of-interest) from the previous as described above, but doing may changes the analysis because it may not help the analyst to understand how the planned sales amount (Amt) has changed between the two time points.

Accordingly, a one-sided filter may be employed to determine and classify changes that occur between time points. A one-sided filter may be considered a filter that may be applied to one time point and computed in the other time point (but not applied). Accordingly, analysts may be enabled to reason about what items/records the filter would impact.

For example, if an analyst wanted to analyze what happened to sales for quarter, as filter such as qtr_closed='4/1/2020' may be defined. Accordingly, the filter would be applied to the first time point data object to exclude records that are not in Q1 2020. Further, in this example, in data object 704 (representing the second time point) the filter would be evaluated and the filt column set to TRUE if the item/record passed the filter or set to FALSE if the item/record does not pass the filter.

Accordingly, in this example, absent the one-sided filter described above, visualization engines may summarize the changes as one item/record retained (ID=2), two items/records gone (ID=1,3), and one item/record as new (ID=5).

However, employing a one-sided filter may provide an improved summary: one item/record gone (ID=1); one item/record retained (ID=2); one item/record moved to another quarter (ID=3, now 7/1/2020); and one item/record as new (ID=5).

Note that in this example ID=4 is not included in the summary because it would have been filtered out by the qtr_closed filter had it been applied (e.g., it would have been filtered in both time points). In this example, ID=5 is included in the summary because the filter on qtr_closed would pass and it does not appear in the first time point, so it may be considered to be new. Accordingly, in this example, analysts interested in analyzing how qtr_closed may impact the data may be provided an improved picture of what has changed in the data.

Note, in this example and others herein, for brevity and clarity data objects may be illustrated using tables. However, one of ordinary skill in the art will appreciate that data objects may be represented using data structures, such as, lists, arrays, objects/structures (e.g., C++, Javascript, Java, .Net, or the like), or the like. Likewise, data objects may be stored in various formats, such as, database tables, JSON, XML, CSV, serialized objects, or the like, without departing from the scope of the disclosed innovations.

FIG. 8 illustrates a logical schematic of system 800 for visualizing temporal information in accordance with one or more of the various embodiments.

In this example, time point data object 802 and time point data object 804 are slightly different than time point data object 702 or time point data object 704 described above. In these versions, each data object is illustrated as having a field/column (qtr_closed) for recording the quarter a sale is expected to close and a field/column (filt) for indicting if a field/record meets filtering criteria.

In some cases, the filtering described for FIG. 7 may be extended to computing the filter in both time points, rather than applying it.

Accordingly, in this example, changes between time points may be summarized as: one item/record gone (ID=1); one item/record retained (ID=2); one item/record moved to another quarter (ID=3, now 7/1/2020); and one item/record moved from another quarter (ID=5, was 1/1/2020)

Accordingly, in this example, analysts may be provided an even more improved view of how sales opportunities have changed between the two time points represented by data object 802 and data object 804.

Note, in some cases, a primary key in the data objects of interest may not be available. Or, in some cases, the primary key may be at the wrong level of detail to support an analysis.

Continuing with our sales data example, if the data set is at a lower level of detail, with one record per line item on the order and a field uniquely identifying the account, these techniques for by analyzing changes between time points may be employed subsequent to one or more preliminary aggregations, as follows: aggregate the data set up to the desired level of detail (e.g. Account), including necessary measures and filter columns; outer-join the aggregate data set together on the appropriate column (e.g. Account); and apply the logic described above for classifying the changes.

In some cases, filter columns (if any) may need to be at the desired level of detail and not lower. Because in some cases they must be computable after the first aggregation step above. Also, in some cases, careful choice of aggregates must be made, because there are two aggregation steps (the first step above, and the summarization step). For example, additive aggregates are the safest choice here.

Note, in this example and others herein, for brevity and clarity data objects may be illustrated using tables. However, one of ordinary skill in the art will appreciate that data objects may be represented using data structures, such as, lists, arrays, objects/structures (e.g., C++, Javascript, Java, .Net, or the like), or the like. Likewise, data objects may be stored in various formats, such as, database tables, JSON, XML, CSV, serialized objects, or the like, without departing from the scope of the disclosed innovations.

Figure 9:
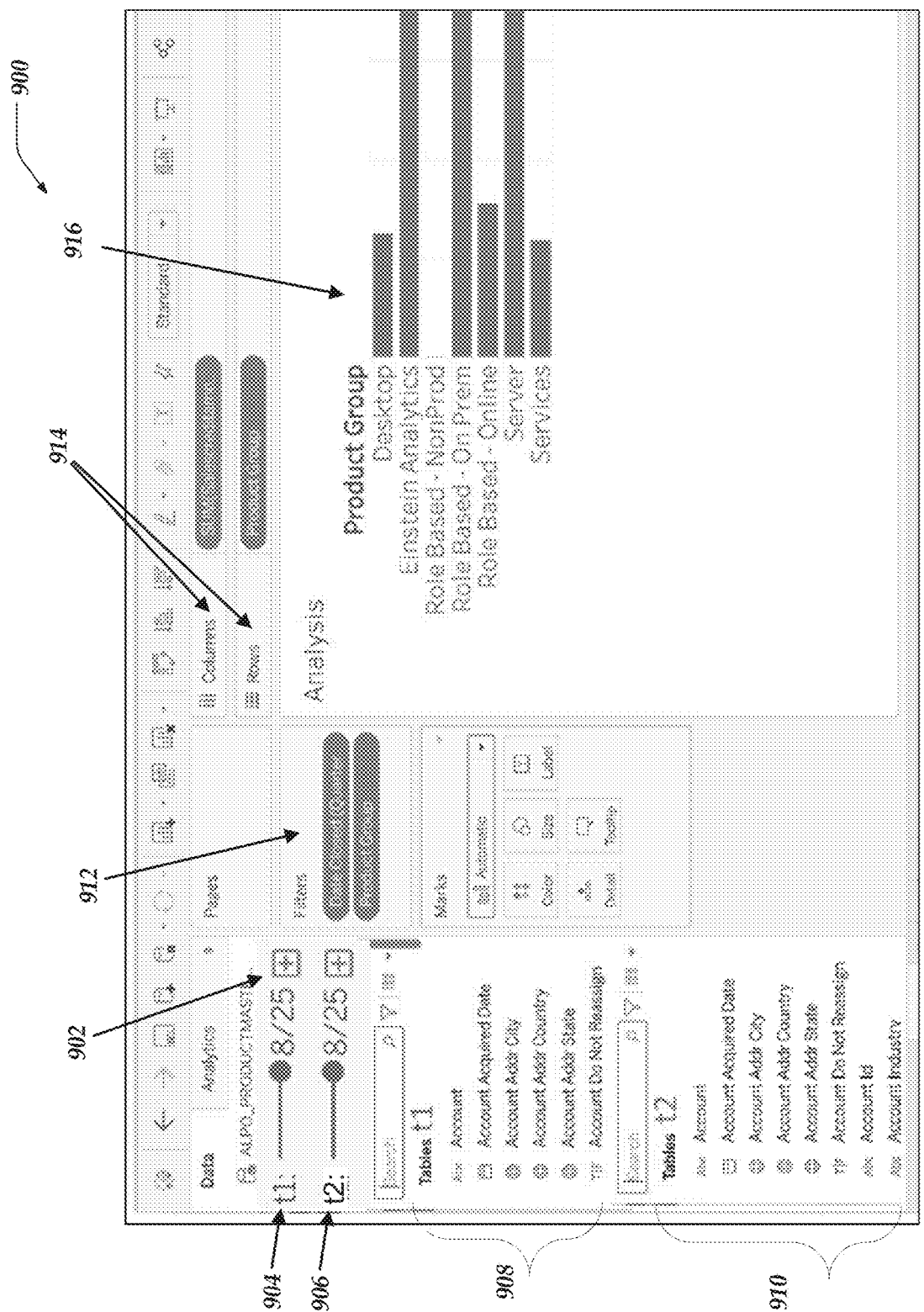
FIG. 9 illustrates a representation of a user interface for visualizing temporal information in accordance with one or more of the various embodiments.

FIG. 9 illustrates a representation of user interface 900 for visualizing temporal information in accordance with one or more of the various embodiments.

In one or more of the various embodiments, visualization engines may be arranged to provide user interfaces for various users, including, visualization authors, business analysts, or the like. In some embodiments, user interfaces may include one or more user interface controls that enable users to perform one or more actions for visualizing temporal information. One of ordinary skill in the art will appreciate that a variety of user interfaces may be provided without departing from the scope of the innovations disclosed herein. Accordingly, in some embodiments, visualization engines may be configured to generate one or more user interfaces based on templates, rules, resource files, or the like, provided via configuration information to account for local circumstances or local requirements. However, one of ordinary skill in the art will appreciate that the disclosure of user interface 900 is at least sufficient for disclosing the innovations included herein.

In this example, for some embodiments, user interface 900 includes user interface control 902 for adding time points to an analysis or visualization. In this example, control 902 represents a button control that if pressed may add a time point selector to the user interface.

In this example, for some embodiments, user interface 900 includes user interface control 904 for setting a first time point. In this example, control 904 represents a slider control for selecting a time point. Accordingly, in this example, users may interact with slider control 904 to set a date for the first time point. In some embodiments, visualization engines may be arranged to determine allowed time ranges or time point step-sizes based on analyzing the underlying data objects. In some embodiments, if the time point data object may be provided from a data source that supports temporal versions, the visualization engine may be arranged to query the data source to determine the time range of the available versions. Also, in some embodiments, if data object may be versioned using snapshot objects, visualization engine may be arranged to identify range of dates/times represented by available snapshots. In some embodiments, data models may be configured to associate meta-data with snapshot version data objects (time point data objects) that enable visualization engines to determine a range of available time points. Also, in this example, control 906 represents a user interface for selecting a second time point.

Further, in this example, for some embodiments, user interface control 908 and user interface control 910 represent interactive displays of the selected time point data objects, including field names. Also, in this example, for some embodiments, user interface control 912 represents a user interface for selecting, or declaring filter information. Also, in this example, for some embodiments, user interface controls 914 represent user interface controls that enable users to select information for including in visualizations, including, fields for rows or columns in visualizations, aggregate functions, or the like. In this example, for some embodiments, visualization user interface control 916 represents a display panel for display a visualization for visualizing temporal information that may be generated based on a visualization model and one or more user interface inputs.

Figure 10:
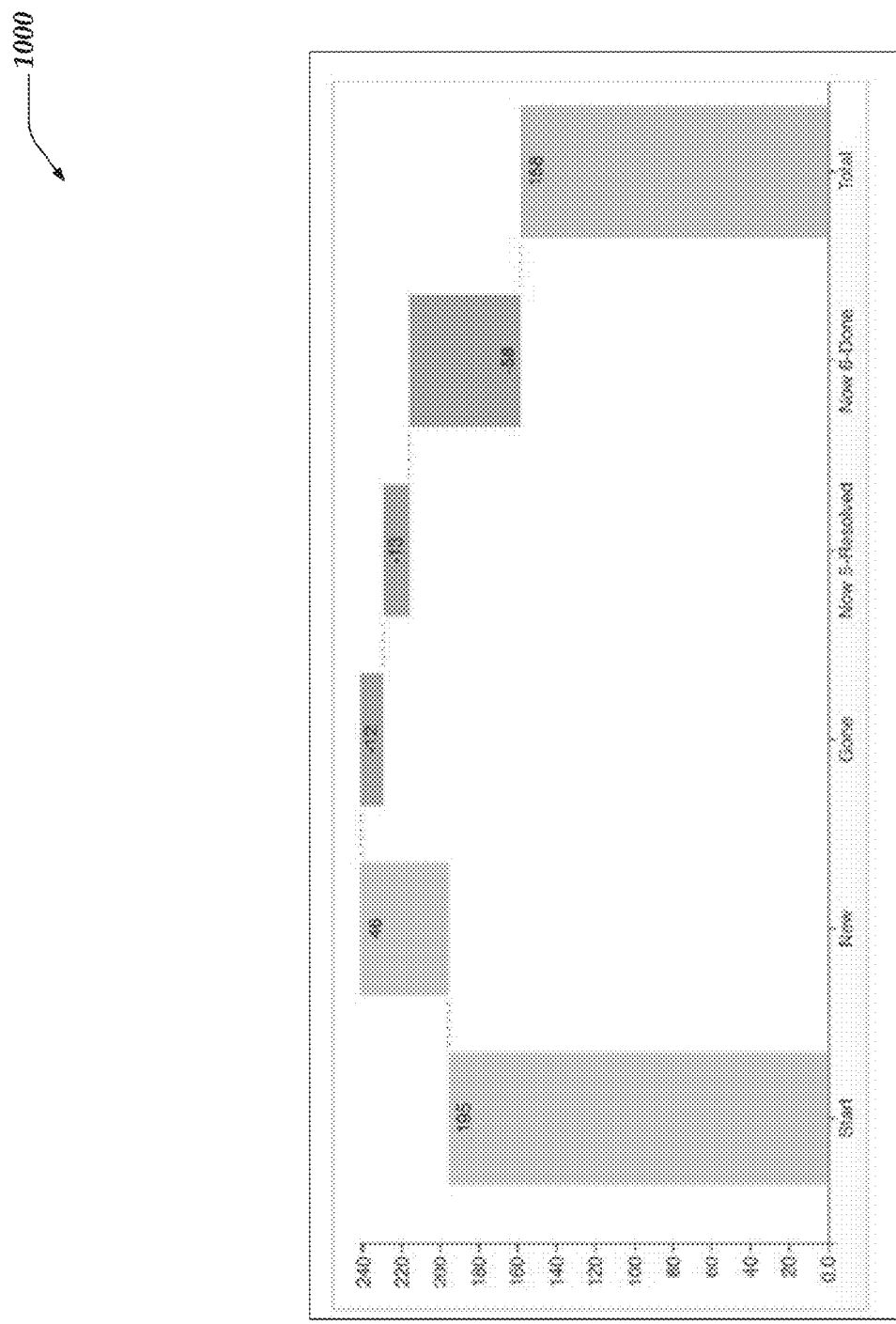
FIG. 10 illustrates a representation of a display panel for visualizing temporal information in accordance with one or more of the various embodiments.

FIG. 10 illustrates a representation of display panel 1000 for visualizing temporal information in accordance with one or more of the various embodiments.

In one or more of the various embodiments, visualization engines may be arranged to enable various users, such as, visualization authors, analysts, or the like, to employ various kinds of visualizations for visualizing temporal information. In some embodiments, one or more visualizations may be more or less suitable than other visualizations depending on the kind of analysis or preferences of the users.

Accordingly, visualization platforms may be arranged to enable users to select from various kinds of visualizations to include in their authored visualizations.

In some embodiments, visualization platforms may be arranged to enable users to select waterfall visualizations, such as, shown in display panel 1000 to show the beginning and ending values of a particular metric as a bar. Between them, positive and negative changes may be shown as "delta bars" showing the differences contributed by a variety of factors.

Figure 11:
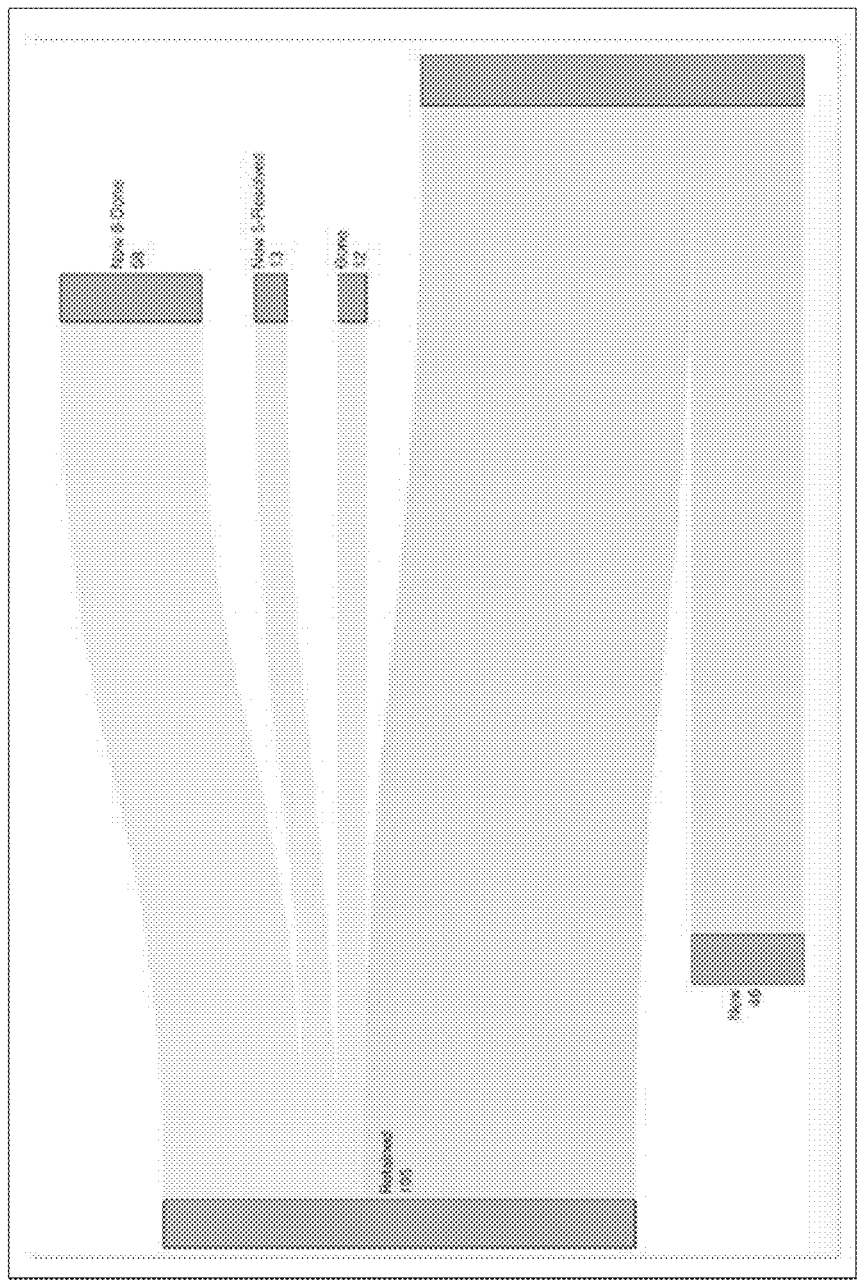
FIG. 11 illustrates a representation of a display panel for visualizing temporal information in accordance with one or more of the various embodiments.

FIG. 11 illustrates a representation of display panel 1100 for visualizing temporal information in accordance with one or more of the various embodiments.

As described above, visualization platforms may be arranged to enable users to select from various kinds of visualizations. In this example, display panel 1100 includes a Sankey diagram visualization. Usually, Sankey diagrams are designed to show the flow of data in a system, often between distinct states in the system. In this example, the two time points are connected by the items/records that are unchanged between them. Other flows into the second and out of the first show values that are newly in the second time point, or that were in the first but are not in the second. In this visualization, items/records classified as "reduced" are shown as having the change in value from the first time point to the second time point as flowing out of the first time point, for example.

Generalized Operations

FIGS. 12-16 represent generalized operations for visualizing temporal information in accordance with one or more of the various embodiments. In one or more of the various embodiments, processes 1200, 1300, 1400, 1500, and 1600 described in conjunction with FIGS. 12-16 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 12-16 may be used for visualizing temporal information in accordance with at least one of the various embodiments or architectures such as those described in conjunction with FIGS. 4-11. Further, in one or more of the various embodiments, some or all of the actions performed by processes 1200, 1300, 1400, 1500, and 1600 may be executed in part by modeling engine 322 or visualization engine 324 running on one or more processors of one or more network computers.

Figure 12:
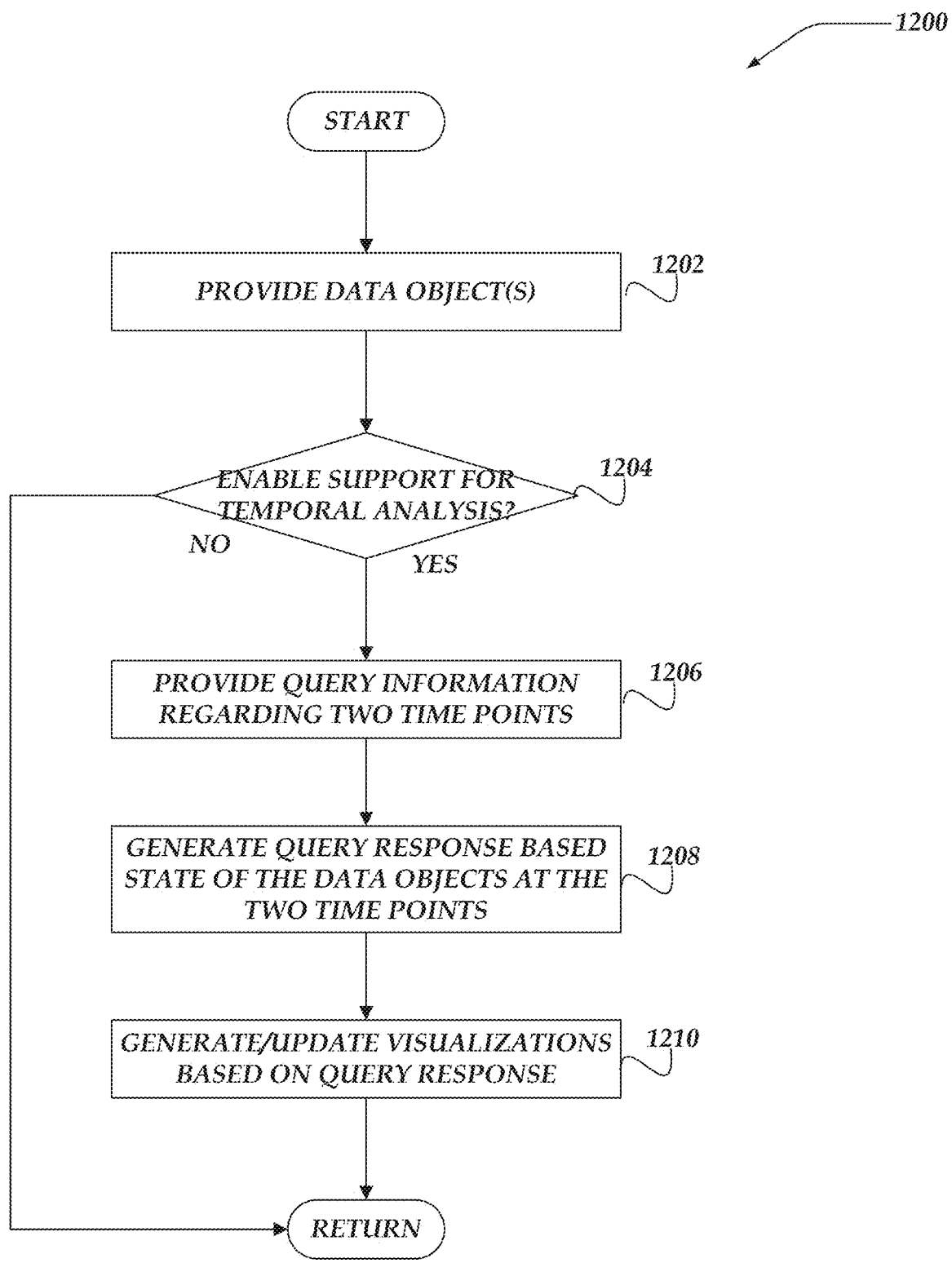
FIG. 12 illustrates an overview flowchart of a process for visualizing temporal information in accordance with one or more of the various embodiments.

FIG. 12 illustrates an overview flowchart of process 1200 for visualizing temporal information in accordance with one or more of the various embodiments. After a start block, at block 1202, in one or more of the various embodiments, one or more data objects may be provided to a visualization platform.

In some embodiments, the data objects may be provided from one or more data sources, such as, RDBM/SQL databases, object-oriented databases, time-series databases, or the like. For example, in some embodiments, the data objects may correspond to or otherwise be derived from tables in a database or other data sources.

In one or more of the various embodiments, data objects may be provided as part of one or more data models that may be authored by one or more users, such as, visualization authors or analysts. As described above, for some embodiments, users may be enabled select one or more data objects from user interfaces.

At decision block 1204, in one or more of the various embodiments, if visualization platforms enable support for temporal analysis, control may flow to block 1206; otherwise, control may be returned to a calling process.

In some cases, the provided data objects or their underlying data sources may not support temporal analysis. In some embodiments, a data source may automatically keep versions of data objects at different time points. In some embodiments, one or more custom processes may be employed, such as, configuring a data source to automatically generate periodic 'snapshots' of data objects. For example, a data source may be arranged to generate daily snapshots of a data object (e.g., table) that stores sales information.

Accordingly, in some embodiments, visualization platforms may be arranged to enable users to declare or designate the data objects that support temporal analysis. Likewise, in some embodiments, visualization engines may be arranged to infer that data objects may be temporally related based on various characteristics of the data objects, such as, having the same fields, one or more records representing the same or overlapping time periods, or the like. Accordingly, in some embodiments, visualization engines may be arranged to automatically activate one or more temporal analysis features if one or more data objects may be determined to be temporally related. Also, in some embodiments, visualization engines may be arranged to enable users/authors to manually identify temporal relationships between data objects as part of the data modeling process or visualization authoring process.

At block 1206, in one or more of the various embodiments, query information regarding at least two time points may be provided to a visualization engine.

In some embodiments, query information may be provided by users, analysts, visualization authors, or the like, via one or more user interfaces provided by the visualization engine. In some cases, these user interfaces may be administrative user interfaces that may be employed by users that may be authoring visualizations. In some cases, one or more user interfaces may be included in authored visualizations to enable other users to conduct interactive analysis of the data underlying the visualizations.

Accordingly, in some embodiments, visualization engines may be arranged to provide user interfaces that enable users to interactively generate query information based selecting data objects or data object fields, to include in visualizations. Likewise, in some embodiments, visualization engines may be arranged to provide one or more user interfaces that enable users select one or more built-in query functions, such as, computing sums, differences, ratios, various statistical computations, or the like. Likewise, in some embodiments, visualization engines may be arranged to provide one or more user interfaces that enable users to declare one or more custom functions.

Also, in some embodiments, visualization engines may be arranged to provide one or more user interfaces that enable users to include filters that may declare one or more conditions for excluding items (records) in data objects at different time points from result data objects.

Further, in some embodiments, visualization engines may be arranged to provide command-line interfaces, machine accessible APIs, or the like, that enable query information to be provided.

In one or more of the various embodiments, visualization engines may be arranged to validate the query information to identify issues, such as, syntax errors, references to directed to non-temporal data objects, or the like.

In some embodiments, visualization engines may be arranged to accept query information provided in a variety of formats or query languages. In some embodiments, visualization engines may include one or more query parsers suitable for parsing the various query languages or query formats. Likewise, in some embodiments, visualization engines may be arranged to enable other query parsers to be loaded. Accordingly, in some embodiments, visualization engines may be arranged to employ rules, libraries, extensions, or the like, for parsing query information that may be provided via configuration information to account for local circumstances or local requirements.

At block 1208, in one or more of the various embodiments, the visualization engine may be arranged to generate a response to the query information based on the state of the data objects at the two different time points.

As described above and in further detail below, visualization engines may be arranged to determine data objects at different time points and join them into a result data object that may be employed to analyze how data objects may change over two or more time points.

Accordingly, in some embodiments, visualization engines may be arranged to enable visualization authors to design visualizations that include temporal information based on the fields in the result data object.

Note, in some embodiments, a data object at a first time point and another data object at a second time point may be considered to represent the same primary data object, just at different time points. Thus, for some embodiments, even though the data object for the first time point and the data object for the second time may be instantiated as separate data structures, they may be considered to represent the same primary data object. However, for brevity and clarity the version of the data object corresponding to a first time point and the version of the data object corresponding to a second time point may be referred to as different data objects, such as, first data object and second data object.

At block 1210, in one or more of the various embodiments, the visualization engine may be arranged to generate or update one or more visualizations based on the information included in the query response.

In one or more of the various embodiments, visualizations may be authored to include one or more features, values, tables, marks, graphs, plots, or the like, that include or represent temporal information that may be determined or derived from the result data object created from data objects at different time points.

In one or more of the various embodiments, users may be enabled to interactively adjust or select the first time point or second time point. Accordingly, in some embodiments, visualization engines may be arranged to automatically generate updated query information that includes the adjusted or selected time points. Accordingly, in some embodiments, visualization engines may be arranged to automatically execute the updated query information to provide an updated result data object. Thus, in some embodiments, visualization engines may be arranged to employ the updated result data object to update one or more visualizations.

Next, in one or more of the various embodiments, control may be returned to a calling process.

Figure 13:
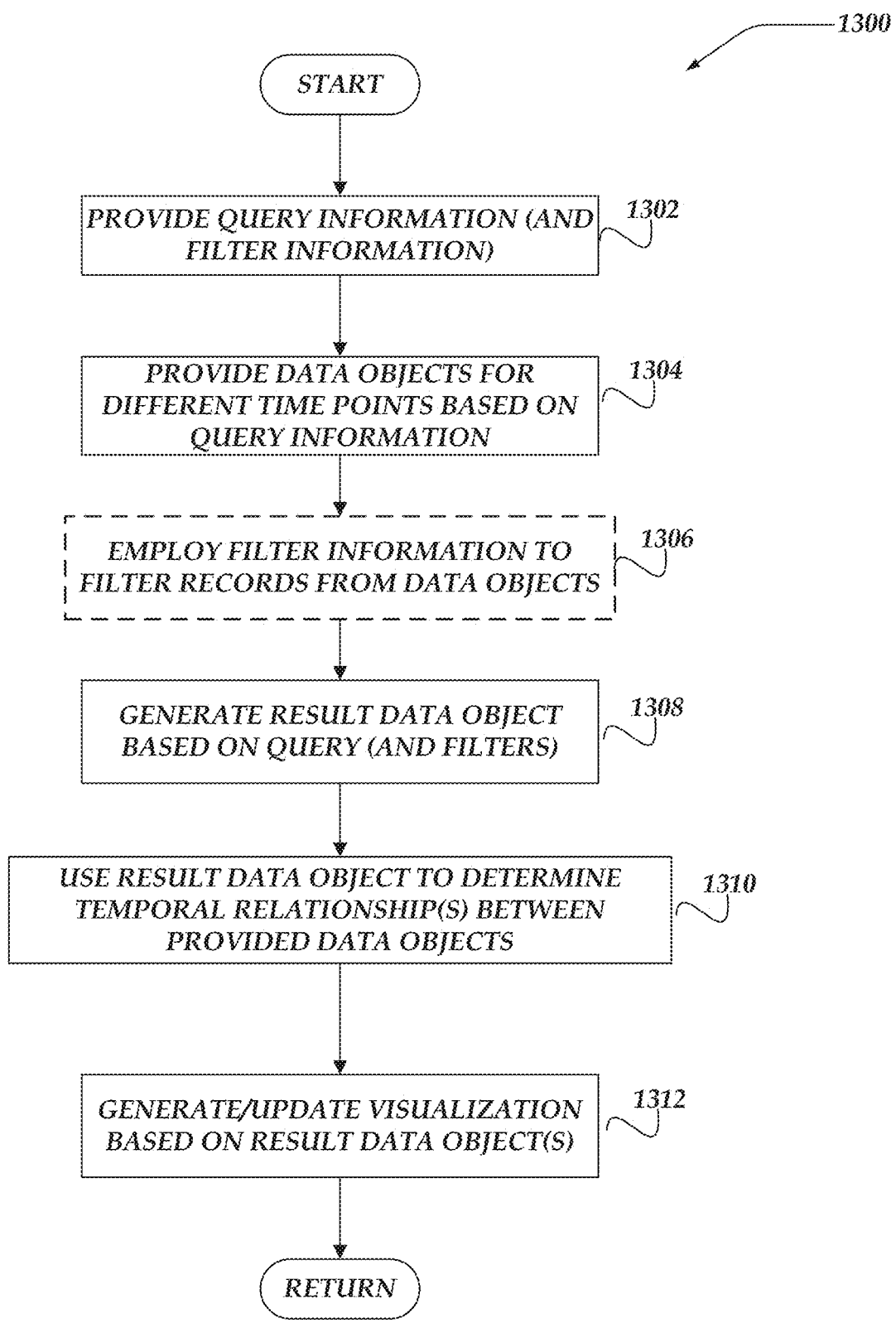
FIG. 13 illustrates a flowchart for a process for visualizing temporal information in accordance with one or more of the various embodiments.

FIG. 13 illustrates a flowchart for process 1300 for visualizing temporal information in accordance with one or more of the various embodiments. After a start block, at block 1302, in one or more of the various embodiments, a visualization engine may be provide query information that may include filter information.

In some embodiments, query information may be provided by users, analysts, visualization authors, or the like, via one or more user interfaces provided by the visualization engine. In some cases, these user interfaces may be administrative user interfaces that may be employed by users that may be authoring visualizations. In some cases, one or more user interfaces may be included in authored visualizations to enable users to conduct interactive analysis of the data underlying the visualizations.

Further, in some embodiments, visualization engines may be arranged to provide command-line interfaces, machine accessible APIs, or the like, that enable query information to be provided.

In one or more of the various embodiments, visualization engine may be arranged to validate the query information to identify issues, such as, syntax errors, references to directed to non-temporal data objects, or the like.

In some embodiments, visualization engines may be arranged to accept query information provided in a variety of formats or query languages. In some embodiments, visualization engines may include one or more query parsers suitable for parsing the various query languages or query formats. Likewise, in some embodiments, visualization engine may be arranged to enable other query parsers to be loaded. Accordingly, in some embodiments, visualization engines may be arranged to employ rules, libraries, extensions, or the like, for parsing query information that may be provided from configuration information to account for local circumstances or local requirements.

Also, in some embodiments, visualization engines may be arranged to enable users to select, declare, or otherwise include filter information in or with the query information. In one or more of the various embodiments, filter information may define one or more conditions that may be applied to determine if records/items from first time point data objects or second time point data objects should be included in a result data object.

At block 1304, in one or more of the various embodiments, the visualization engine may be arranged to provide two or more data objects for different time points based on the query information. In one or more of the various embodiments, visualization engines may be arranged to determine a first data object at a first time point and a second data object at second time point based on the query information.

In some cases, for some embodiments, data sources may provide built-in features that enable automatic time period based versioning of data objects. Accordingly, in such cases, query information may identify one data object and two time points. In other cases, for some embodiments, data sources may store different time period versions of data object as separate data objects that may need to be referenced individually. Thus, in this cases, the query information may identify two data objects that may represent data of the same object at different time points.

In one or more of the various embodiments, modeling engines may be arranged to enable users to indicate one or more temporal relationships or temporal tracking methods within data models. For example, if a database supports automatic time point versioning, data model authors may set an attribute on the corresponding data objects that indicate the support for automatic time point versioning.

Likewise, for example, if a database is configured to periodically generate sequential snapshot tables to capture time point versions, modeling engines may enable users to declare the table naming pattern that may be used. Accordingly, for some embodiments, a database may be configured to name each snapshot using a naming scheme, such as, <table-name><date-of-snapshot>, or the like. For example, a database may be configured take periodic snapshots of a base table named 'sales' and create a new tables to store each snapshot using a naming scheme, such as, sales-20201001, sales-20201002, and so on. Accordingly, in some embodiments, visualization engines may be arranged to automatically recognize these snapshot tables if the naming scheme/protocol may be declared or otherwise recognized.

Further, for example, in some embodiments, databases may be configured to track temporal changes by appending snapshot records taken from source tables to snapshot tables where each appended snapshot record includes an additional column that stores a time value that may correspond to the time the snapshot was taken. Thus, in this example, queries may include various expressions for grouping, filtering, comparing, aggregating, or the like, snapshot records based on the snapshot datetime values stored in the additional column.

Also, in some embodiments, visualization engines may be arranged to enable users to interactively select one or more data objects and declare that they may represent the same data object at different time points.

At block 1306, in one or more of the various embodiments, optionally, the visualization engine may be arranged to employ filter information included with the query information to filter one or more data items from one or more of the data objects.

In one or more of the various embodiments, filter information may be information that includes one or more conditions that may be evaluated to determine if records/items in time point data objects should be included in result data objects. In one or more of the various embodiments, filter information may be considered to be part of the query information. In some embodiments, filters may be included in queries sent to data sources depending on the type of filter or capabilities of the underlying data source. In other cases, filters may be applied by the visualization engine after data has been retrieved from data sources.

In one or more of the various embodiments, visualization engines may be arranged to provide one or more user interfaces that enable users to interactively select or declare one or more filters that may be employed for visualizing temporal information. Also, in some embodiments, visualization engines or modeling engines may be arranged to enable users or visualization authors to provide custom filters that are declared using one or more query languages, visual programming user interfaces, or the like.

Note, this block is indicated as being optional because in some cases for some embodiments the query information may not include filter information. Accordingly, in such cases, filtering may be omitted.

At block 1308, in one or more of the various embodiments, the visualization engine may be arranged to generate a result data object based on the query information and filter information (if any).

In one or more of the various embodiments, visualization engines may be arranged to generate one or more result data objects based on joining data objects representing different time points into one data objects. In one or more of the various embodiments, fields in the result data object may correspond to fields for each time point data object being evaluated.

Note, the query syntax for generating result data objects may vary depending on the features or capabilities of the underlying data sources. Likewise, in some embodiments, the configuration of the underlying data sources may influence the syntax or formulation of the queries used to generate result data objects.

At block 1310, in one or more of the various embodiments, the visualization engine may be arranged to determine one or more temporal relationship(s) between the provided data objects.

Accordingly, in some embodiments, visualization engines may be arranged to determine changes between the included time point data objects by examining fields in the result data object. For example, if the fields of an item in a result data object that correspond a first time point data object representing a first time point are null while corresponding fields for a second time point data object have non-null values it may indicate the item was added after the first time point and at or before the second time point. In some embodiments, visualization engines may be arranged to perform similar analysis to determine if items were removed or changed between time points.

Also, in one or more of the various embodiments, visualization engines may be arranged to identify items corresponding to numerical values or counts that have increased or decreased between time points by comparing the values of the fields in result data objects that correspond to the time point data objects.

At block 1312, in one or more of the various embodiments, the visualization engine may be arranged to generate or update one or more visualizations based on the result data objects.

In one or more of the various embodiments, visualization engines may be arranged to enable visualization authors or analysts to generate one or more visualizations that include representations of temporal-based information that may be derived from the result data objects. In one or more of the various embodiments, visualization engines may be arranged to automatically recommend visualizations based on the query information that was provided to generate the result data objects. In some embodiments, visualization engines may be arranged to provide one or more user interfaces that enable users to interactively include information associated with one or more fields from the result data objects in one or more visualizations.

Accordingly, in some embodiments, if query information may be updated, visualizations based on the results of the query information may be automatically updated.

Next, in one or more of the various embodiments, control may be returned to a calling process.

Figure 14:
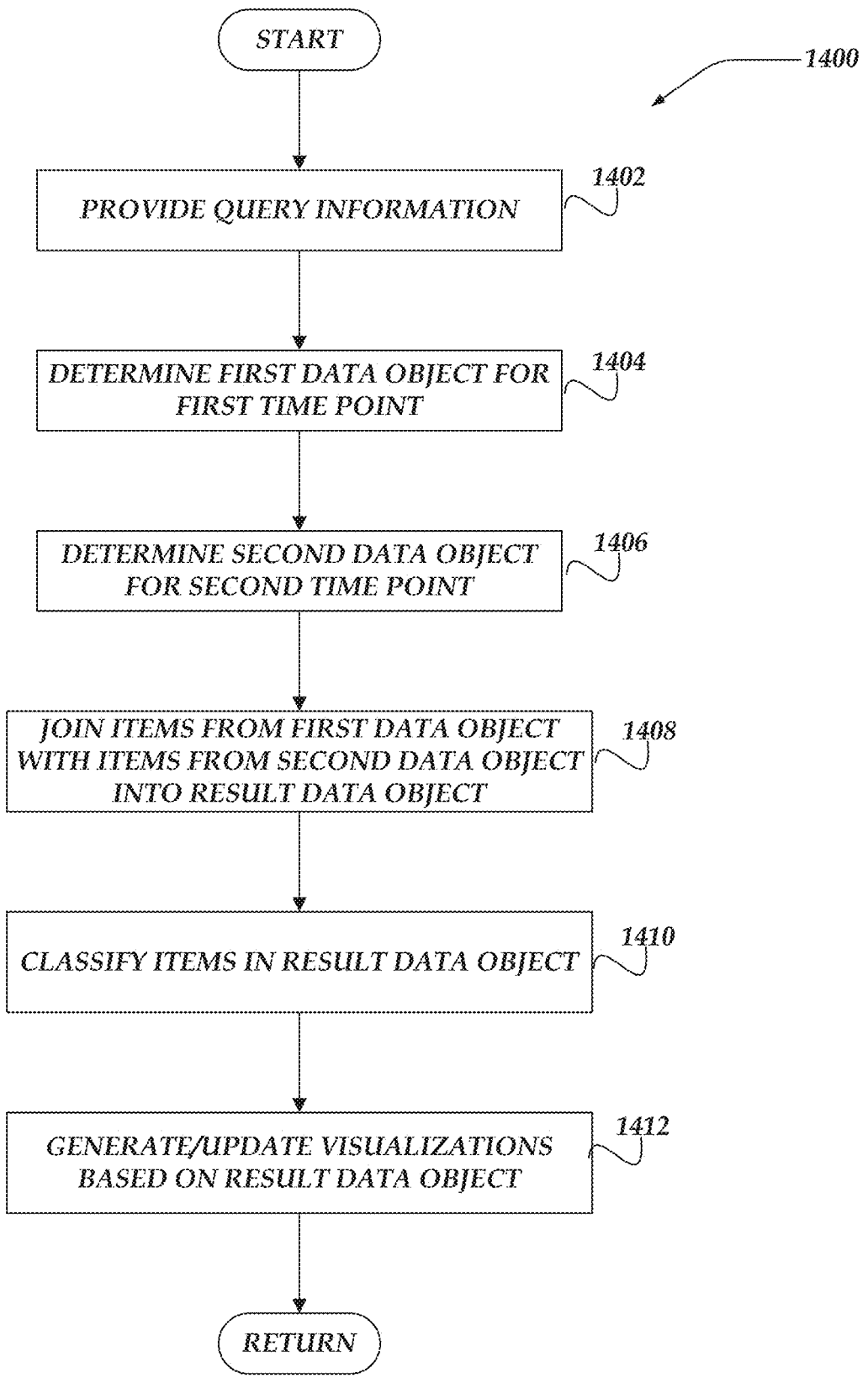
FIG. 14 illustrates a flowchart for a process for visualizing temporal information in accordance with one or more of the various embodiments.

FIG. 14 illustrates a flowchart for process 1400 for visualizing temporal information in accordance with one or more of the various embodiments. After a start block, at block 1402, in one or more of the various embodiments, a visualization engine may be provide query information. As described above, in some embodiments, query information may be provided by users, analysts, visualization authors, or the like, via one or more user interfaces provided by the visualization engine. In some cases, these user interfaces may be administrative user interfaces that may be employed by users that may be authoring visualizations. In some cases, one or more user interfaces may be included in authored visualization to enable users to conduct interactive analysis of the data underlying the visualizations.

Further, in some embodiments, visualization engines may be arranged to provide command-line interfaces, machine accessible APIs, or the like, that enable query information to be provided.

In one or more of the various embodiments, visualization engine may be arranged to validate the query information to identify issues, such as, syntax errors, references to unavailable/unknown data objects, attempts to access restricted data objects, temporal query clauses directed to non-temporal data objects, or the like.

In some embodiments, visualization engines may be arranged to accept query information provided in a variety of formats or query languages. In some embodiments, visualization engines may include one or more query parsers suitable for parsing the various query languages or query formats. Likewise, in some embodiments, visualization engine may be arranged to enable other query parsers to be loaded. Accordingly, in some embodiments, visualization engines may be arranged to employ rules, libraries, extensions, or the like, provided configuration information to account for local circumstances or local requirements.

At block 1404, in one or more of the various embodiments, the visualization engine may be arranged to determine a first data object that may be associated with a first time point.

In one or more of the various embodiments, visualization engines may be arranged to identify a first data object from the query information. In some embodiments, the query information may include labels, reference values, or the like, that may be interpreted as identifying the first data object.

Also, as mentioned above, in some embodiments, visualization engines may provide user interfaces that enable users to declare a first data object or a first time point.

In one or more of the various embodiments, a first data object may represent a data object has its values preserved at a particular first time point. For example, in some embodiments, a first data object at the time point 10/10/2020 12:10:00 represent the data object as it was at the time point.

In some embodiments, the underlying data sources that store the data objects may inherently support temporal information by automatically maintaining version snapshots of data objects. Accordingly, in some embodiments, these time-aware data sources may support query language expressions that enable queries to be scoped to particular times. For example, in some cases, time-aware data sources may be implemented to record changes to data objects such that one or more changes may be associated with a timestamp when the change occurred.

At block 1406, in one or more of the various embodiments, the visualization engine may be arranged to determine a second data object that may be associated with a second time point.

In one or more of the various embodiments, visualization engines may be arranged to identify a second data object from the query information. In some embodiments, the query information may include labels, reference values, or the like, that may be interpreted for identifying the second data object.

As mentioned above, in some embodiments, visualization engines may provide user interfaces that enable users to declare a second data object.

In some embodiments, the second data object and the first data object may be considered to represent the same data object with each representing the state of the data object at different times. Accordingly, in some embodiments, differences in the number of items or field values may attributes to changes that occurred to the same data object at different times.

At block 1408, in one or more of the various embodiments, the visualization engine may be arranged to perform one or more actions to join data items from the first data object with data items from the second data object into a result object.

In one or more of the various embodiments, as described above, the first data object and the second data object represent the same data object at different times. Accordingly, in some embodiments, the first data object and second data object may include the same fields. Also, in some cases, the values of fields or numbers of records may vary between the first data object and the second data object based on changes to the data that may have occurred between the first time point and second time point.

In one or more of the various embodiments, the first data object and second data object may be joined based on a primary key field that is common to both data objects. In some embodiments, visualization engines may be arranged to parse the query information to determine the relevant primary key.

In some cases, for some embodiments, visualization engines may be arranged to determine primary keys based on the underlying data sources. In some embodiments, data models or data sources may include meta-data that identifies the primary key. In some embodiments, visualization engine may be arranged to infer or predict a primary key based one or more heuristics that evaluate fields (e.g., table columns) to determine if they may be predicted to be primary keys.

In some embodiments, if the visualization engine may be unable to infer or predict the primary key from the data sources or data objects, visualization engines may be arranged to provide user interfaces that enable users to identify a primary key that is shared between the first and second data objects.

In one or more of the various embodiments, visualization engines may be arranged to generate a result data object that includes fields from the first data object and the second data object in one data object. In some embodiments, visualization engines may be arranged to associate a tag or marker that indicates if a field in the result data object comes from the first data object or the second data object.

In one or more of the various embodiments, visualization engines may be arranged to generate a query the conforms to the underlying data source that retrieves data items from the first data object and the second data object, combining them into a single result data object. In some embodiments, the result data object may include the fields from the first data object and the fields from the second data object such that each item in the result data object may be combination of the fields from the first data object and the second data object. In some embodiments, if a record or field value may be absent from the first data object or the second data object, its corresponding field in the result data object may be set to a null value. See, FIG. 5, and its description, for an example of a result data object generated based on a first data object and a second data object.

At block 1410, in one or more of the various embodiments, the visualization engine may be arranged to classify items in result data object.

In one or more of the various embodiments, visualization engines may be arranged to evaluate fields of the records in the result data object. As described above, each record in the result data object may include fields from the first data object and fields from the second data object. Accordingly, in some embodiments, visualization engines may be arranged to evaluate the records in the result data object to determine one or more differences between the first data object and the second data object. For example, referring to result data object 506 in FIG. 5, the t1 fields of fourth record are set to null because that record does not exist in the first data object (t1). Similarly, in this example, the fields in the first record that correspond to the second data object (t2) are set to null because the record exists in the first data object (t1) but not the second data object (t2).

Accordingly, in one or more of the various embodiments, visualization engines may be arranged to determine the records that have been added or removed since the first time point by identifying records in the result data object that have null values. In some embodiments, the analysis may be simplified by evaluating if the primary key fields of the first or second data object are null to determine if records may have been added or removed since the first time point.

Thus, in some embodiments, visualization engines may be arranged to evaluate each record (item) in result data object to classify the records as new, gone, or retained as follows: if the field in the result data object that corresponds to the primary key field of the first data object is not null and the field in the result data object that corresponds to the primary key field of the second data object is null then the record may be classified as being 'gone'"; if the field in the result data object that corresponds to the primary key field of the first data object is null and the field in the result data object that corresponds to the primary key field of the second data object is not null then the record is 'new'; and if the field in the result data object that corresponds to the primary key field of the first data object is not null and the field in the result data object that corresponds to the primary key field of the second data object is not null then record is 'retained'.

In one or more of the various embodiments, visualization engines may be arranged to include a field in the result data object that represents the classification of the record. Alternatively, in some embodiments, visualization engine may be arranged to indirectly associate the classification of each result data object item with its respective item using one or more data structures that may be separate from the result data object. For example, visualization engine may be arranged to generate another data object that maps classification values to items in the result data object.

At block, 1412, in one or more of the various embodiments, the visualization engine may be arranged to generate or update one or more visualizations based on the result data object.

As described above, in one or more of the various embodiments, visualization engines may be arranged to interpret the result data object in the context of one or more visualizations. In some embodiments, visualization engine may be arranged to enable analysts or visualization authors to create visualizations that incorporate the changes between the first time point and the second time point into visualizations. The particular visualization, such as, tables, waterfall charts, Sankey diagrams, or the like, may vary depending on the requirements of the visualization author or other users. For example: visualizations may show changes in the number of records (items) between two time points; differences in field values for items that exist at both time points, or the like. While, for brevity and clarity only a few visualization are described here, one of ordinary skill in the art will appreciate that visualization authors may be enabled to design many different types of visualizations that use information determined from the result data object.

Next, in one or more of the various embodiments, control may be returned to a calling process.

Figure 15:
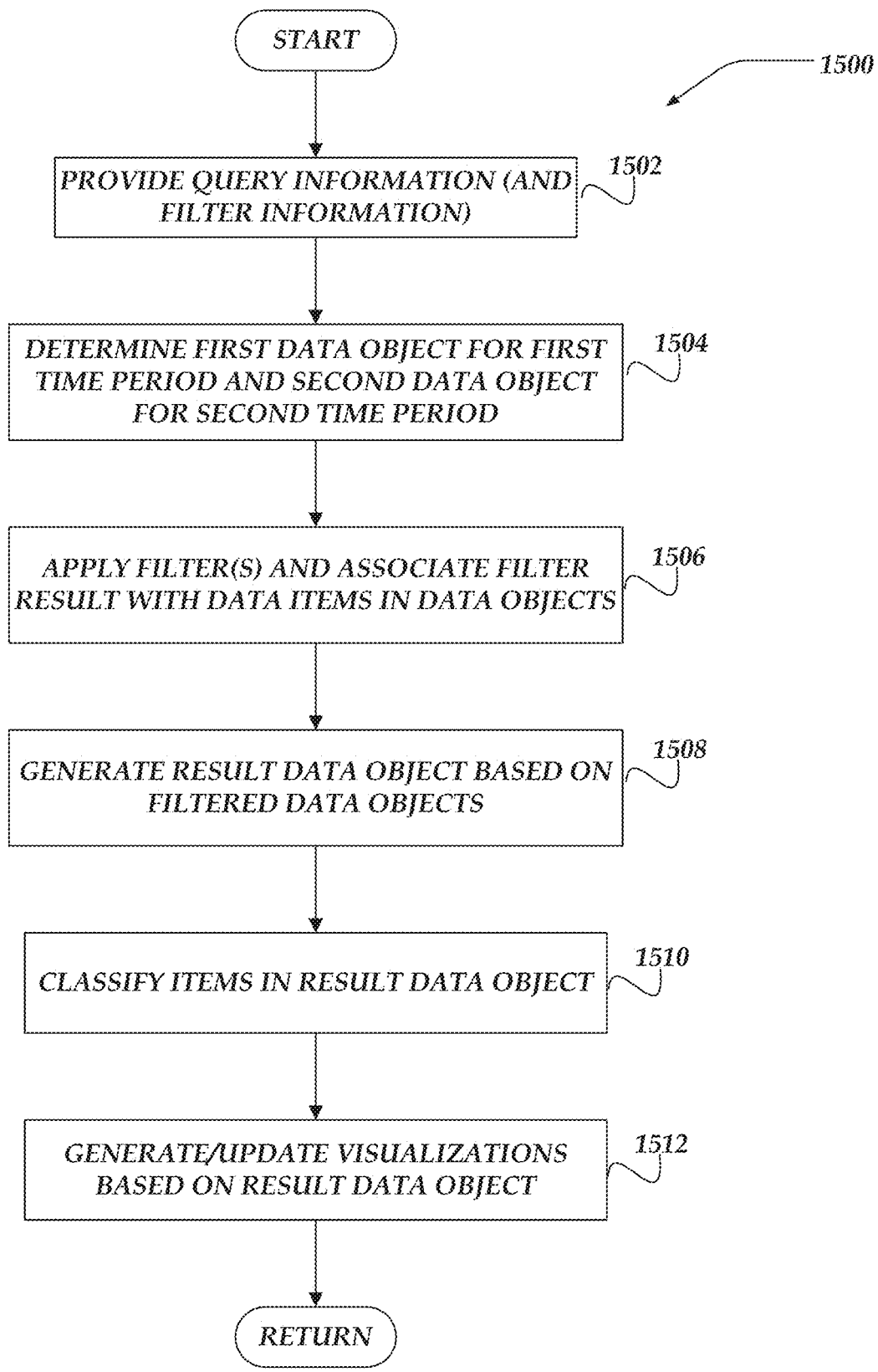
FIG. 15 illustrates a flowchart for a process for visualizing temporal information in accordance with one or more of the various embodiments.

FIG. 15 illustrates a flowchart for process 1500 for visualizing temporal information in accordance with one or more of the various embodiments. After a start block, at block 1502, in one or more of the various embodiments, a visualization engine may be provide query information that may include filter information. This actions for this block may be considered to block 1402 except that filter information may be included with the query information.

In one or more of the various embodiments, filter information may include one or more expressions or conditions that may be applied against items in time point data objects.

At block 1504, in one or more of the various embodiments, the visualization engine may be arranged to determine a first data object for a first time period and a second data object for a second time period. As described above, a first time point data object and second time point data object may be determined from the query information.

At block 1506, in one or more of the various embodiments, the visualization engine may be arranged to apply one or more filters and associate one or more filter results with one or more data items in the first data object or second data object.

At block 1508, in one or more of the various embodiments, the visualization engine may be arranged to generate result data object based on the filtered data objects. As described above, visualization engine may be arranged to generate result data objects by join the items in the first time point data object and the second time point data object.

In some embodiments, if the query information includes filter information, visualization engines may be arranged to include one or more filter fields in the result data object. In some embodiments, visualization engines may be arranged to employ filter field to record if a record/item in a result data object meets the condition of one or more filters.

Also, in one or more of the various embodiments, visualization engines may be arranged to employ one or more data structures that may be separate from the result data objects to track if items in the result data object may match the criteria or conditions of one or more filters.

Also, in some embodiments, one or more filters may be declared to exclude one or more items from the time point data objects from being included in result data objects.

At block 1510, in one or more of the various embodiments, the visualization engine may be arranged to classify the data items in the result data object. As described above, visualization engines may be arranged to evaluate or compare fields in the result data object to determine relevant changes in between the time point objects. Also, in some embodiments, visualization engines may be arranged to employ filter fields in result data objects to determine one or more records/items in the result data object that may match the criteria or conditions of one or more filters.

At block 1512, in one or more of the various embodiments, the visualization engine may be arranged to generate or update one or more visualizations based on the result data object. As described above, visualization engines may be arranged to automatically update visualizations may be designed to represent one or more fields from the result data object.

Next, in one or more of the various embodiments, control may be returned to a calling process.

Figure 16:
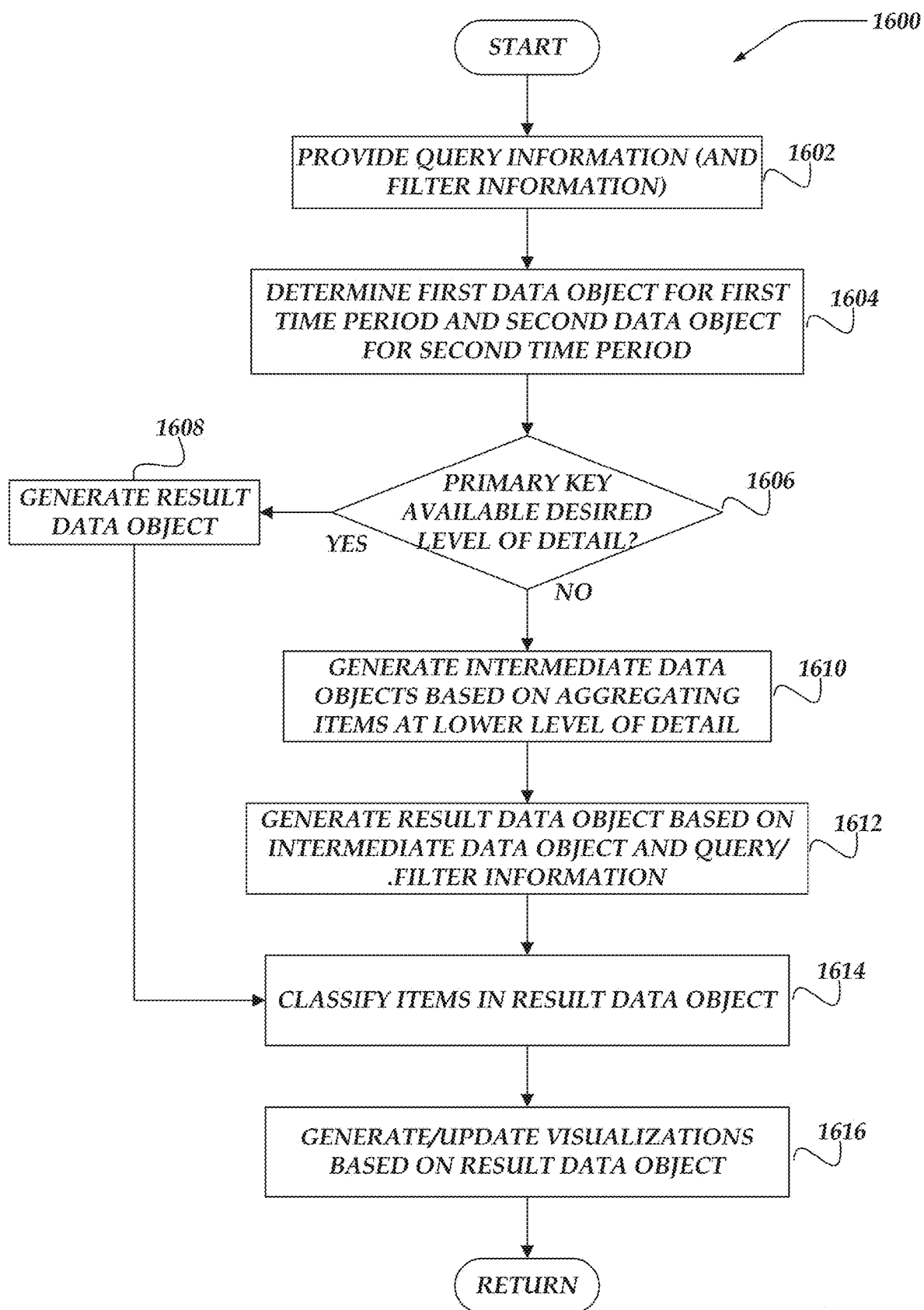
FIG. 16 illustrates a flowchart for a process for visualizing temporal information in accordance with one or more of the various embodiments.

FIG. 16 illustrates a flowchart for process 1600 for visualizing temporal information in accordance with one or more of the various embodiments. After a start block, at block 1602, in one or more of the various embodiments, a visualization engine may be provide query information that may include filter information.

At block 1604, in one or more of the various embodiments, the visualization engine may be arranged to determine a first data object for a first time point and a second data object for a second time point.

At decision block 1606, in one or more of the various embodiments, if the primary key of interest is available at the current level of detail, control may flow to block 1610; otherwise, control may flow to block 1608.

At block 1608, in one or more of the various embodiments, the visualization engine may be arranged to generate a result data object based on the first data object and the second data object. If the primary key of interest is at the appropriate level of detail for the visualization or analysis, the visualization engine may generate a result data object as described above.

At block 1610, in one or more of the various embodiments, the visualization engine may be arranged to generate one or more intermediate data objects based aggregating data items at lower levels of detail. In one or more of the various embodiments, if the primary key of interest is not at the appropriate level of detail, these detailed records may be eligible for aggregating to provide one or more aggregate records. Accordingly, in some embodiments, visualization engines may employ intermediate data objects that provide temporary access to data object that include fields that store the aggregate values.

In some cases, for some embodiments, one or more fields at the level of detail of the primary key may be unsuitable for some aggregations. For example, a field suitable for counting/summing may be unsuitable for other aggregate functions, such as, computing averages, or the like. In some cases, visualization engines may be arranged to recognize that aggregate functions may be limited for a given field in the time point data object or result data objects. In other cases, visualization engines may enable users to generate non-nonsensical aggregates that may recognized by the user if used in visualizations.

At block 1612, in one or more of the various embodiments, the visualization engine may be arranged to generate a result data object based on the intermediate data objects and the query/filter information. Similar to generating result data objects from time point data objects, visualization engines may be arranged to combine the intermediate data objects to generate a result data object.

At block 1614, in one or more of the various embodiments, the visualization engine may be arranged to classify the data items in the result data object. As described above, visualization engine may evaluate the items in the result data object to classifying them based on temporal information that may be determine from the result data object.

At block 1616, in one or more of the various embodiments, the visualization engine may be arranged to generate or update one or more visualizations based on the result data object. As described above, visualization engines may be arranged to dynamically generate or update visualizations as query information may be changed producing updated result data objects.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed is:

1. A method of visualizing temporal data performed at a computing device having one or more processors, a display, and memory, the method comprising:

receiving a request to determine changes in a data set selected from a data source, wherein the request includes a first point in time and a second point in time after the first point in time;

generating a query to perform a full outer join between (1) a first data table, from the data source, wherein the first data table corresponds to a first state of the data set at the first point in time, and (2) a second data table, from the data source, wherein the second data table corresponds to a second state of the data set at the second point in time, and wherein the first data table and the second data table have a same plurality of columns;

executing the query to retrieve a result set from the data source, wherein executing the query includes performing the full outer join between the first data table and the second data table on a common column and the retrieved result set includes both matching and unmatching rows from the first data table and the second data table;

classifying each record in the retrieved result set into a respective category of a plurality of categories that indicate changes in the data set between the first point in time and the second point in time;

performing a summarization of records in the retrieved result set for each category of the plurality of categories, including aggregating respective values of a target attribute to determine a total value of the target attribute for each category of the plurality of categories; and generating and displaying, via the display in a graphical user interface, a data visualization according to the summarization of records in the retrieved result set and the classification of each record in the retrieved result set.

2. The method of claim 1, wherein classifying each record includes:

classifying a respective record as new in accordance with a determination that the respective record corresponds to a record in the second data table but not the first data table;

classifying a respective record as present in accordance with a determination that the respective record corresponds to records in both the first data table and the second data table; and classifying a respective record as removed in accordance with a determination that the respective record corresponds to a record in the first data table but not the second data table.

3. The method of claim 1, wherein performing the summarization of records in the retrieved result set for a respective category includes counting a number of records in the respective category of the plurality of categories.

4. The method of claim 1, wherein:
the request is to determine changes of the target attribute in the data set; and
classifying each record includes:
classifying a respective record as reduced in accordance with a determination that a respective value of the target attribute is lower in the second data table relative to the first data table;
classifying a respective record as increased in accordance with a determination the respective value of the target attribute is higher in the second data table relative to the first data table; and
classifying a respective record as unchanged in accordance with a determination that the respective value of the target attribute is the same in the second data table and the first data table; and
the method includes:
displaying the data visualization includes displaying the total value of the target attribute for each category of the plurality of categories.

5. The method of claim 1, wherein:
the request is to determine changes in the data set under a filter condition;
the first data table and the second data table is augmented with a filter column including values indicating whether a respective record is selected when the filter condition is applied; and
classification of each record is based on the filter column, and classifying each record includes:
classifying a respective record as new in accordance with a determination that the respective record corresponds to a record in the second data table and not in the first data table;
classifying a respective record as retained in accordance with a determination that the respective record corresponds to records in both the first data table and the second data table;
classifying a respective record as removed in accordance with a determination that the respective record corresponds to a record in the first data table and not the second data table; and
classifying a respective record as moved in accordance with a determination that the respective record corresponds to a record in the first data table with one value and the second data table with a changed value.

6. The method of claim 1, wherein:
the first data table and the second data table include the common column at a first aggregation level;
the request is to determine changes in the data set at a second aggregation level of the common column; and
the method includes:
aggregating the first data table at the second aggregation level to determine first aggregate table and aggregating the second data table at the second aggregation level to determine a second aggregate table; and
performing the full outer join between the first aggregate table and the second aggregate table on the common column.

7. The method of claim 1, wherein the common column on which the full outer join is performed is a primary key.

8. The method of claim 1, wherein a data visualization engine queries the data source and retrieves data in a time range determined based on the first point in time and the second point in time.

9. A computing system comprising:
a display device;
one or more processors; and
memory coupled to the one or more processors, the memory storing one or more programs configured to be executed by the one or more processors, the one or more programs including instructions for:
receiving a request to determine changes in a data set selected from a data source, wherein the request includes a first point in time and a second point in time after the first point in time;
generating a query to perform a full outer join between (1) a first data table, from the data source, wherein the first data table corresponds to a first state of the data set at the first point in time, and (2) a second data table, from the data source, wherein the second data table corresponds to a second state of the data set at the second point in time, and wherein the first data table and the second data table have a same plurality of columns;
executing the query to retrieve a result set from the data source, wherein executing the query includes performing the full outer join between the first data table and the second data table on a common column and the retrieved result set includes both matching and unmatching rows from the first data table and the second data table;
classifying each record in the retrieved result set into a respective category of a plurality of categories that indicate changes in the data set between the first point in time and the second point in time;
performing a summarization of records in the retrieved result set for each category of the plurality of categories, including aggregating respective values of a target attribute to determine a total value of the target attribute for each category of the plurality of categories; and
generating and displaying, via the display in a graphical user interface, a data visualization according to the summarization of records in the retrieved result set and the classification of each record in the retrieved result set.

10. The computing system of claim 9, wherein classifying each record includes:
classifying a respective record as new in accordance with a determination that the respective record corresponds to a record in the second data table but not the first data table;
classifying a respective record as present in accordance with a determination that the respective record corresponds to records in both the first data table and the second data table; and
classifying a respective record as removed in accordance with a determination that the respective record corresponds to a record in the first data table but not the second data table.

11. The computing system of claim 9, wherein performing the summarization of records in the retrieved result set for a respective category includes counting a number of records in the respective category of the plurality of categories.

12. The computing system of claim 9, wherein:
the request is to determine changes of the target attribute in the data set; and classifying each record includes:
  classifying a respective record as reduced in accordance with a determination that a respective value of the target attribute is lower in the second data table relative to the first data table;
  classifying a respective record as increased in accordance with a determination the respective value of the target attribute is higher in the second data table relative to the first data table; and
  classifying a respective record as unchanged in accordance with a determination that the respective value of the target attribute is the same in the second data table and the first data table; and
the one or more programs include instructions for:
  displaying the data visualization includes displaying the total value of the target attribute for each category of the plurality of categories.

13. The computing system of claim 9, wherein:
the request is to determine changes in the data set under a filter condition;
the first data table and the second data table is augmented with a filter column including values indicating whether a respective record is selected when the filter condition is applied; and
classification of each record is based on the filter column, and classifying each record includes:
  classifying a respective record as new in accordance with a determination that the respective record corresponds to a record in the second data table and not in the first data table;
  classifying a respective record as retained in accordance with a determination that the respective record corresponds to records in both the first data table and the second data table;
  classifying a respective record as removed in accordance with a determination that the respective record corresponds to a record in the first data table and not the second data table; and
  classifying a respective record as moved in accordance with a determination that the respective record corresponds to a record in the first data table with one value and the second data table with a changed value.

14. The computing system of claim 9, wherein:
the first data table and the second data table include the common column at a first aggregation level;
the request is to determine changes in the data set at a second aggregation level of the common column; and
the one or more programs include instructions for:
  aggregating the first data table at the second aggregation level to determine first aggregate table and aggregating the second data table at the second aggregation level to determine a second aggregate table; and
  performing the full outer join between the first aggregate table and the second aggregate table on the common column.

15. A non-transitory computer-readable storage medium storing one or more programs configured for execution by one or more processors in a computing system that includes a display, which when executed by the one or more processors, cause the computing system to:
  receive a request to determine changes in a data set selected from a data source, wherein the request includes a first point in time and a second point in time after the first point in time;
  generating a query to perform a full outer join between (1) a first data table, from the data source, wherein the first data table corresponds to a first state of the data set at the first point in time, and (2) a second data table, from the data source, wherein the second data table corresponds to a second state of the data set at the second point in time, and wherein the first data table and the second data table have a same plurality of columns;
  executing the query to retrieve a result set from the data source, wherein executing the query includes performing the full outer join between the first data table and the second data table on a common column and the retrieved result set includes both matching and unmatching rows from the first data table and the second data table;
  classify each record in the retrieved result set into a respective category of a plurality of categories that indicate changes in the data set between the first point in time and the second point in time;
  perform a summarization of records in the retrieved result set for each category of the plurality of categories, including aggregating respective values of a target attribute to determine a total value of the target attribute for each category of the plurality of categories; and
  generate and display, via the display in a graphical user interface, a data visualization according to the summarization of records in the retrieved result set and classification of each record in the retrieved result set.

16. The non-transitory computer-readable storage medium of claim 15, wherein classifying each record includes:
  classifying a respective record as new in accordance with a determination that the respective record corresponds to a record in the second data table but not the first data table;
  classifying a respective record as present in accordance with a determination that the respective record corresponds to records in both the first data table and the second data table; and
  classifying a respective record as removed in accordance with a determination that the respective record corresponds to a record in the first data table but not the second data table.

17. The non-transitory computer-readable storage medium of claim 15, wherein performing the summarization of records in the retrieved result set for a respective category includes counting a number of records in the respective category of the plurality of categories.

18. The non-transitory computer-readable storage medium of claim 15, wherein:
the request is to determine changes of the target attribute in the data set; and
classifying each record includes:
  classifying a respective record as reduced in accordance with a determination that a respective value of the target attribute is lower in the second data table relative to the first data table;
  classifying a respective record as increased in accordance with a determination the respective value of the target attribute is higher in the second data table relative to the first data table; and
  classifying a respective record as unchanged in accordance with a determination that the respective value of the target attribute is the same in the second data table and the first data table; and
the one or more programs include instructions for:
  displaying the data visualization includes displaying the total value of the target attribute for each category of the plurality of categories.

19. The non-transitory computer-readable storage medium of claim 15, wherein:
the request is to determine changes in the data set under a filter condition;
the first data table and the second data table is augmented with a filter column including values indicating whether a respective record is selected when the filter condition is applied; and
the classification of each record is based on the filter column, and classifying each record includes:
classifying a respective record as new in accordance with a determination that the respective record corresponds to a record in the second data table and not in the first data table;
classifying a respective record as retained in accordance with a determination that the respective record corresponds to records in both the first data table and the second data table;
classifying a respective record as removed in accordance with a determination that the respective record corresponds to a record in the first data table and not the second data table; and
classifying a respective record as moved in accordance with a determination that the respective record corresponds to a record in the first data table with one value and the second data table with a changed value.

20. The non-transitory computer-readable storage medium of claim 15, wherein:
the first data table and the second data table include the common column at a first aggregation level;
the request is to determine changes in the data set at a second aggregation level of the common column; and
the one or more programs, which when executed by the one or more processors, cause the computing system to:
aggregate the first data table at the second aggregation level to determine first aggregate table and aggregate the second data table at the second aggregation level to determine a second aggregate table; and
perform the full outer join between the first aggregate table and the second aggregate table on the common column.

* * * * *